(12) United States Patent
Yang et al.

(10) Patent No.: US 10,917,620 B1
(45) Date of Patent: Feb. 9, 2021

(54) PROJECTION APPARATUS, PROJECTION SYSTEM, AND OPERATION METHOD

(71) Applicant: DELTA ELECTRONICS, INC., Taoyuan (TW)

(72) Inventors: Chung-Yi Yang, Taoyuan (TW); Bor Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/747,544

(22) Filed: Jan. 21, 2020

(30) Foreign Application Priority Data

Aug. 21, 2019 (CN) .......................... 2019 1 0772442

(51) Int. Cl.
| | | |
|---|---|---|
| *H04N 9/31* | (2006.01) | |
| *H04N 7/15* | (2006.01) | |
| *H04L 29/08* | (2006.01) | |
| *H04L 29/06* | (2006.01) | |

(52) U.S. Cl.
CPC ..... *H04N 9/3188* (2013.01); *H04L 29/06027* (2013.01); *H04L 29/08018* (2013.01); *H04N 7/15* (2013.01); *H04N 9/312* (2013.01); *H04N 9/3182* (2013.01)

(58) Field of Classification Search
CPC .... H04N 9/3188; H04N 9/3182; H04N 9/312; H04L 29/06027; H04L 29/08018
See application file for complete search history.

(56) References Cited

U.S. PATENT DOCUMENTS

| | | | | |
|---|---|---|---|---|
| 7,705,862 | B1* | 4/2010 | Teng | G03B 5/04 |
| | | | | 345/647 |
| 9,640,143 | B1* | 5/2017 | Dawson | H04N 9/3182 |
| 9,728,141 | B2* | 8/2017 | Yang | G09G 3/3406 |
| 9,826,277 | B2* | 11/2017 | Wang | H04N 21/4122 |
| 9,830,023 | B2* | 11/2017 | Ichieda | G06F 3/0425 |
| 9,918,058 | B2* | 3/2018 | Takahashi | H04N 9/3129 |
| 10,015,457 | B2* | 7/2018 | Uchiyama | H04N 9/3188 |
| 10,079,996 | B2* | 9/2018 | Takahashi | H04N 9/3194 |
| 10,345,685 | B2* | 7/2019 | Miyagi | H04N 9/312 |
| 10,678,843 | B2* | 6/2020 | Inata | G09G 3/001 |
| 10,681,320 | B2* | 6/2020 | Kotani | G06T 3/40 |
| 2002/0186181 | A1* | 12/2002 | Zodnik | G06F 1/1613 |
| | | | | 345/32 |
| 2003/0115263 | A1* | 6/2003 | Tran | H04L 41/00 |
| | | | | 709/203 |
| 2005/0105055 | A1 | 5/2005 | Olson et al. | |

(Continued)

FOREIGN PATENT DOCUMENTS

| | | |
|---|---|---|
| CN | 105915830 A | 8/2016 |
| CN | 106104436 A | 11/2016 |

(Continued)

*Primary Examiner* — Brian P Yenke
(74) *Attorney, Agent, or Firm* — CKC & Partners Co., LLC

(57) ABSTRACT

A projection apparatus includes a control circuit and a projection circuit. The control circuit includes a first processor and has an Internet-connection function. The first processor is configured to run an operation system. The first processor is configured to control the projection circuit via a first control interface. The projection circuit is configured to receive an original video signal from the control circuit to project a projection image based on the original video signal.

34 Claims, 21 Drawing Sheets

(56) References Cited

U.S. PATENT DOCUMENTS

| | | | |
|---|---|---|---|
| 2007/0033528 A1* | 2/2007 | Merril | G10L 15/26 715/732 |
| 2009/0115915 A1* | 5/2009 | Steinberg | H04N 9/3194 348/745 |
| 2010/0079468 A1* | 4/2010 | Pance | G03B 29/00 345/501 |
| 2010/0318916 A1* | 12/2010 | Wilkins | G06Q 10/10 715/730 |
| 2010/0333175 A1* | 12/2010 | Cox | G09B 7/00 726/3 |
| 2011/0243380 A1* | 10/2011 | Forutanpour | G06F 3/017 382/103 |
| 2011/0277028 A1* | 11/2011 | Piazza | H04L 63/0209 726/11 |
| 2012/0025957 A1* | 2/2012 | Yang | G08C 17/00 340/12.5 |
| 2014/0078160 A1* | 3/2014 | Yang | H04N 9/3147 345/531 |
| 2014/0285532 A1* | 9/2014 | Yang | H04N 9/3182 345/690 |
| 2015/0015853 A1* | 1/2015 | Nakashin | H04N 9/3188 353/85 |
| 2015/0215592 A1* | 7/2015 | Tone | H04N 9/3155 348/744 |
| 2015/0296191 A1* | 10/2015 | Kim | G03B 21/16 353/30 |
| 2015/0310578 A1* | 10/2015 | You | G06T 1/20 345/547 |
| 2016/0044291 A1* | 2/2016 | Lin | H04N 9/3173 353/43 |
| 2016/0127624 A1* | 5/2016 | Woo | G06F 3/0304 348/36 |
| 2016/0219338 A1* | 7/2016 | Wang | H04L 67/02 |
| 2017/0127017 A1* | 5/2017 | Takahashi | H04N 5/23238 |
| 2017/0171521 A1* | 6/2017 | Jung | G06K 7/1404 |
| 2017/0272717 A1* | 9/2017 | Nishizawa | G03B 21/005 |
| 2017/0272718 A1* | 9/2017 | Mikawa | G02B 26/0833 |
| 2017/0289508 A1 | 10/2017 | Fujioka | |
| 2017/0310937 A1* | 10/2017 | Wada | G06T 5/50 |
| 2017/0332148 A1* | 11/2017 | Fullerton | H04L 12/4625 |
| 2018/0352205 A1* | 12/2018 | Kotani | G09G 5/00 |
| 2018/0364902 A1* | 12/2018 | Yang | G03B 21/00 |
| 2019/0208161 A1* | 7/2019 | Wan | H04N 5/145 |
| 2019/0297308 A1* | 9/2019 | Yang | H04N 9/3188 |
| 2020/0159323 A1* | 5/2020 | Gand | G06F 3/0481 |
| 2020/0162745 A1* | 5/2020 | Hindriks | H04N 21/234 |

FOREIGN PATENT DOCUMENTS

| | | |
|---|---|---|
| CN | 107241588 A | 10/2017 |
| TW | 201017427 A1 | 5/2010 |
| TW | 201400970 A | 1/2014 |

* cited by examiner

LST

| D1 | D2 | D3 | D4 |
|---|---|---|---|
| projection pane 1 | playing time 1 | name 1 | source 1 |
| | 0800 ~ 0830 | Hallway | https://www.example.com/video/ |
| | 0830 ~ 1100 | Hallway - main | http://192.168.1.8 |
| | 1100 ~ 1200 | TechIntro | file:///C:/Users/Hallway/TechIntro.html |
| projection pane 2 | playing time 2 | name 2 | source 2 |
| | 0800 ~ 0830 | Exhibit Prg1 | https://www.example2.com/Exhibit/Prg1 |
| | 0830 ~ 1100 | Exhibit - main | http://192.168.1.66 |
| | 1100 ~ 1200 | Exhibit - adv | file:///C:/Users/Exhibit/Exhibit_adv.html |

(d41, d42 point to entries in D4 column)

FIG. 11B

PROJECTION APPARATUS, PROJECTION SYSTEM, AND OPERATION METHOD

RELATED APPLICATIONS

This application claims priority to Chinese Application Serial Number 201910772442.0 filed Aug. 21, 2019, which is herein incorporated by reference.

BACKGROUND

Technical Field

The present disclosure relates to a projection technology. More particularly, the present disclosure relates to a projection apparatus that can run an operation system and have an Inter-connection function.

Description of Related Art

With the development of projection technology, projection apparatuses have been widely used. However, the functions of projection apparatuses according to the prior art are limited.

For the foregoing reason, there is a need to expand other functions of the projection apparatus, which is one of the important issues in this field.

SUMMARY

One embodiment of the present disclosure is related to a projection apparatus. The projection apparatus includes a control circuit and a projection circuit. The control circuit includes a first processor and has an Internet-connection function. The first processor is configured to run an operation system. The first processor is configured to control the projection circuit via a first control interface. The projection circuit is configured to receive an original video signal from the control circuit to project a projection image based on the original video signal.

One embodiment of the present disclosure is related to a projection system. The projection system includes a first projection apparatus, a second projection apparatus, and an image capturing device. The first projection apparatus is configured to project a first test image. The second projection apparatus is configured to project a second test image. The image capturing device is coupled to the first projection apparatus and the second projection apparatus. The image capturing device is configured to receive the first test image and the second test image. The first projection apparatus is configured to adjust the first projection apparatus and the second projection apparatus based on the first test image and the second test image. The first projection apparatus includes a control circuit and a projection circuit. The control circuit includes a first processor and has an Internet-connection function. The first processor is configured to run an operation system. The first processor is configured to control the projection circuit via a first control interface. The projection circuit is configured to receive an original video signal from the control circuit to project a projection image based on the original video signal.

One embodiment of the present disclosure is related to an operation method. The operation method includes: running an operation system by a processor of a control circuit of a projection apparatus, in which the control circuit has an Internet-connection function; controlling a projection circuit of the projection apparatus via a control interface by the processor; and receiving an original video signal from the control circuit so as to project a projection image based on the original video signal by the projection circuit.

As the above embodiments, the projection apparatus of the present disclosure has the Internet-connection function and can run an operation system, which can be used to realize a smart projector.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 11B illustrates a schematic diagram of a playlist according to some embodiments of the present disclosure.

DETAILED DESCRIPTION

Figure 1A:
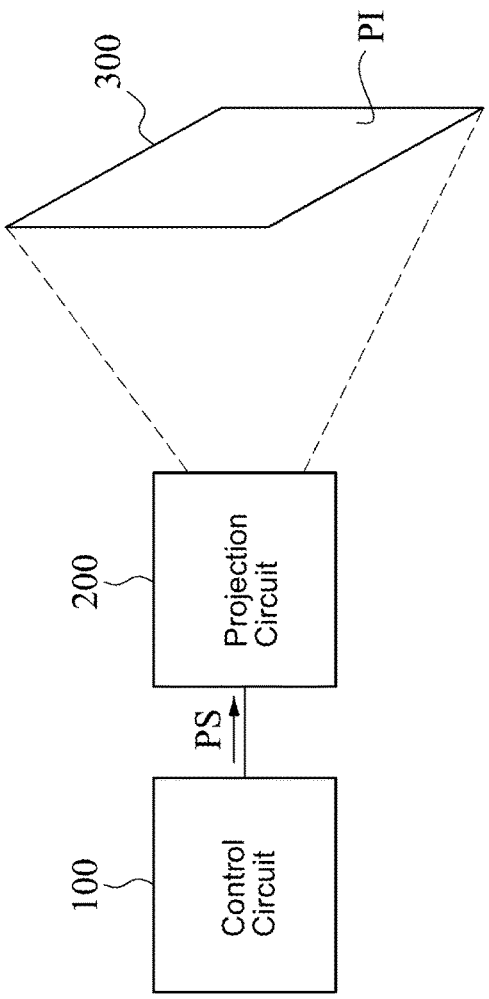
FIG. 1A illustrates a functional block diagram of a projection apparatus according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In this document, the term "coupled" may also be termed "electrically coupled," and the term "connected" may be termed "electrically connected." "Coupled" and "connected" may also be used to indicate that two or more components cooperate or interact with each other.

Reference is made to FIG. 1A. FIG. 1A illustrates a functional block diagram of a projection apparatus PA1 according to some embodiments of the present disclosure. As shown in FIG. 1A, the projection apparatus PA1 includes a control circuit 100 and a projection circuit 200. The control circuit 100 is coupled to the projection circuit 200. The control circuit 100 may transmit an original video signal PS to the projection circuit 200. The projection circuit 200 may receive the original video signal PS, and project a projection image PI on a screen 300 based on the original video signal PS. In some embodiments, the control circuit 100 includes a processor (such as a processor 110 in FIG. 2A). The processor is, for example, an application processor core. The processor may control the projection circuit 200 via a control interface (such as a control interface 120 in FIG. 2A), and the processor may run an operation system. The operation system is, for example, an Android system or a Linux system, but the present disclosure is not limited in this regard. In addition, the control circuit 100 may have an Internet-connection function. That is to say, the projection apparatus PA1 is able to be connected to a network system by using a wireless or wired method. Since the projection apparatus PA1 may run the operation system and have the Internet-connection function, the functions of the projection apparatus PA1 may be expanded to realize a smart projector as compared with the conventional projection apparatus.

Figure 1B:
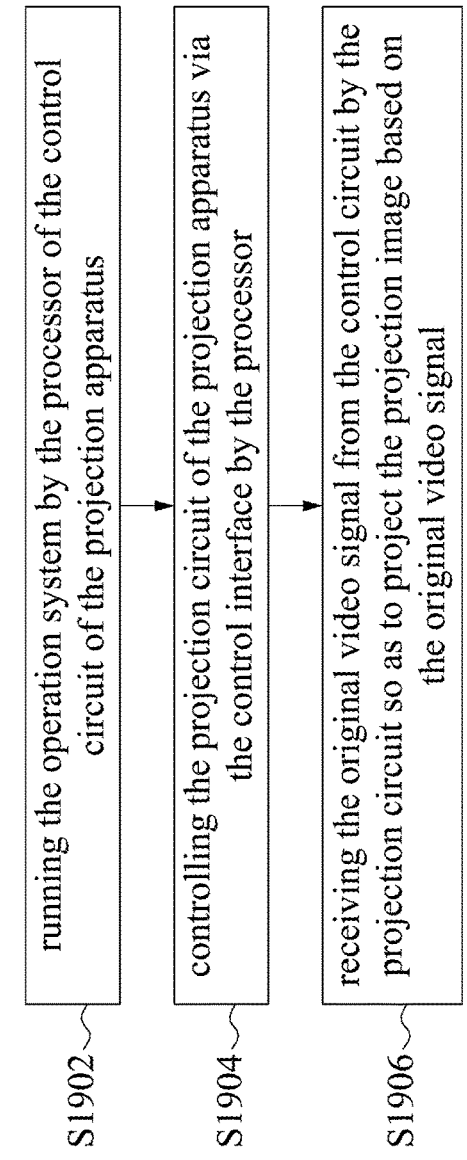
FIG. 1B illustrates a flowchart of an operation method of a projection apparatus according to some embodiments of the present disclosure.

FIG. 1B illustrates a flowchart of an operation method 1900 of the projection apparatus PA1 according to some embodiments of the present disclosure. In some embodiments, the operation method 1900 is applied to the projection apparatus PA1 in FIG. 1A, but the present disclosure is not limited in this regard. The operation method 1900 is discussed with reference to FIG. 1A to facilitate understanding. As shown in FIG. 1B, the operation method 1900 includes an operation S1902, an operation S1904, and an operation S1906.

In operation S1902, the processor (such as the processor 110 in FIG. 2A) of the control circuit 100 of the projection apparatus PA1 is configured to run the operation system. In operation S1904, the processor 110 is configured to control the projection circuit 200 of the projection apparatus PA1 via the control interface (such as the control interface 120 in FIG. 2A). In operation S1906, the projection circuit 200 is configured to receive the original video signal PS from the control circuit 100 so as to project the projection image PI based on the original video signal PS.

Figure 2A:
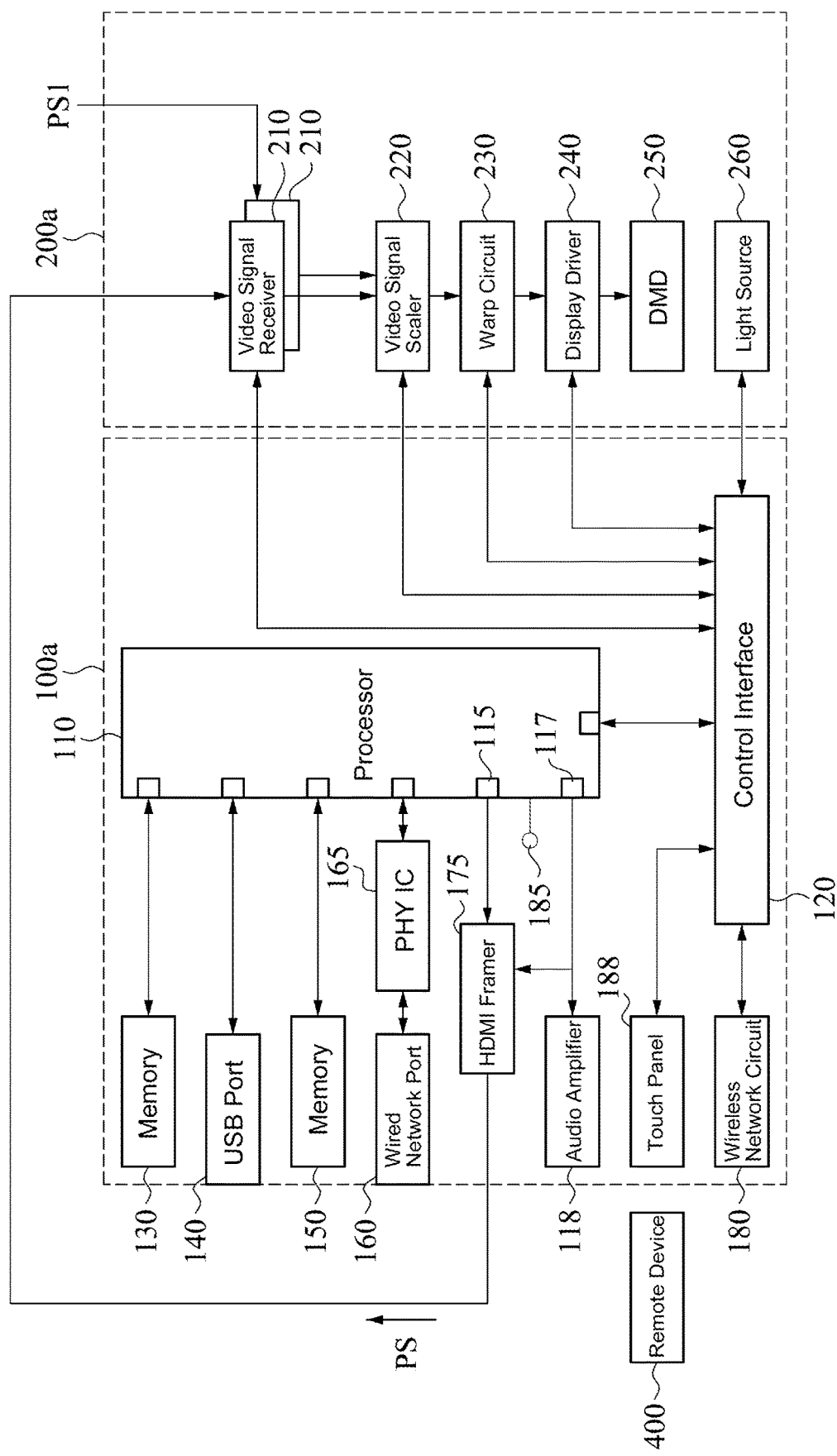
FIG. 2A illustrates a functional block diagram of a projection apparatus according to some embodiments of the present disclosure.

Reference is made to FIG. 2A. FIG. 2A illustrates a functional block diagram of a projection apparatus PA2 according to some embodiments of the present disclosure. As shown in FIG. 2A, a control circuit 100a includes the processor 110. As mentioned above, the processor 110 is, for example, an application processor core, and the processor 110 may run an operation system or run an application (APP). Additionally, the control circuit 100a further includes the control interface 120. As mentioned above, the control circuit 100a may transmit one or more control instructions to a projection circuit 200a via the control interface 120 so as to control components in the projection circuit 200a. The control interface 120 is, for example, an Inter-Integrated Circuit bus (I2C bus) interface, a Serial Peripheral Interface (SPI), a Universal Asynchronous Receiver/Transmitter (UART) interface, a Pulse Width Modulation (PWM) interface, or a Secure Digital Input-Output (SDIO) interface. However, the present disclosure is not limited in this regard.

In some embodiments, the control circuit 100a further includes a memory 130, a universal serial bus (USB) port 140, a memory 150, a wired network port 160, a physical layer integrated circuit (PHY IC) 165, a High Definition Multimedia Interface framer (HDMI framer) 175, an audio amplifier 118, a touch panel 188, and a wireless network circuit 180. As shown in FIG. 2A, the processor 110 is coupled to the memory 130. The memory 130 may be implemented by using a volatile memory, such as a Double Data Rate Synchronous Dynamic Random Access Memory (DDR). In addition, the processor 110 is coupled to the universal serial bus port 140. The universal serial bus port 140 may be plugged in by a universal serial bus device. In some embodiments, a universal serial bus device may be configured to expand the control interface of projection apparatus PA2. In addition, the processor 110 is coupled to the memory 150. The memory 150 may be implemented by using a non-volatile memory, such as an Embedded Multi Media Card (eMMC) flash memory. The memory 150 may be configured to store the previously mentioned operation system. Additionally, the processor 110 is coupled to the wired network port 160 (such as an RJ45 port) via the PHY IC 165 so as to realize the functions of a wired network. In addition, the processor 110 includes a video output port 115. The video output port 115 is coupled to the HDMI framer 175 so as to output a video signal to the HDMI framer 175. In some embodiments, the processor 110 further includes an audio output port 117. The audio output port 117 is coupled to the HDMI framer 175 so as to output an audio signal to the HDMI framer 175. The HDMI framer 175 synthesizes the video signal from the video output port 115 and the audio signal from the audio output port 117 to generate the original video signal PS. The original video signal PS is a video signal conforming to a transmission format of the High Definition Multimedia Interface (HDMI). In addition, the control circuit 100a includes the audio amplifier 118. The audio output port 117 outputs the audio signal to the audio amplifier 118 so as to broadcast via the audio amplifier 118. Additionally, the touch panel 188 is coupled to the control interface 120. When a user operates the touch panel 188, the touch panel 188 generates an operating instruction correspondingly. The operating instruction may be transmitted to the processor 110 via the control interface 120, and the processor 110 controls the components in the projection circuit 200a or components in the control circuit 100a according to the operating instruction. In addition, the wireless network circuit 180 is coupled to the processor 110 via the control interface 120 so as to realize the functions of a wireless network. In some embodiments, the wireless network circuit 180 may be implemented by using a Wireless Fidelity (Wi-Fi) module. In addition, the control circuit 100a includes an infrared receiver 185. The infrared receiver 185 may receive a remote signal from a remote device 400, and provide the remote signal to the processor 110. The processor 110 then processes and interprets the remote signal so as to perform an operation correspondingly according to the remote signal, for example, to control the projection circuit 200a or the control circuit 100a.

In some embodiments, the projection circuit 200a includes a video signal receiver 210, a video signal scaler 220, a warp circuit 230, a display driver 240, a digital micro-mirror device (DMD) 250, and a light source 260. As shown in FIG. 2A, the control interface 120 is coupled to the video signal receiver 210, the video signal scaler 220, the warp circuit 230, the display driver 240, and the light source 260. As mentioned previously, the processor 110 may control the components in the projection circuit 200a via the control interface 120. The original video signal PS generated by the HDMI framer 175 of the control circuit 100a is received by the video signal receiver 210. The video signal receiver 210 may transmit the original video signal PS to the video signal scaler 220. In some embodiments, the video signal receiver 210 may be embedded into the video signal scaler 220. The video signal scaler 220 may perform a scaling function on the original video signal PS to generate a scaled video signal. The scaled video signal is transmitted to the warp circuit 230. The warp circuit 230 may perform a warping function on the scaled video signal to generate a warped video signal. The warping function includes edge blending, geometry distortion correction, or geometry adjustment. The warped video signal is transmitted to the display driver 240. The display driver 240 may drive the digital micro-mirror device 250 based on the warped video signal so that the digital micro-mirror device 250 cooperates with the light source 260 to project the projection image PI shown in FIG. 1A. In greater detail, the display driver 240 may process the warped video signal based on the required timing and image. The light source 260 is, for example, a laser module, a light emitting diode module, or an ultra-high performance (HUP) light source. However, the present disclosure is not limited in this regard. Additionally, the video signal receiver 210 may also receive an external original video signal PS1 (such as a DVD signal) from an outside so as to transmit the external original video signal PS1 to the video signal scaler 220 for subsequent process and projection.

Figure 2B:
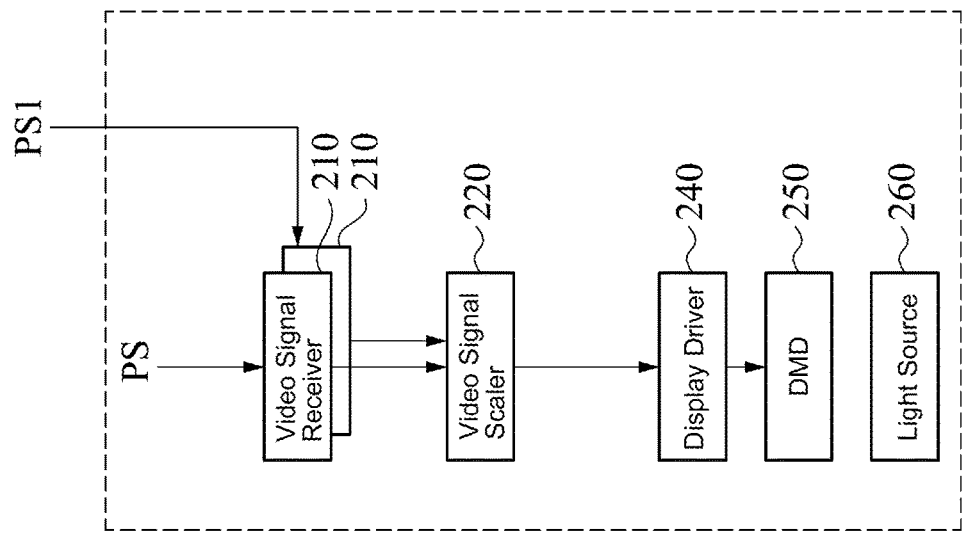
FIG. 2B illustrates a functional block diagram of a projection circuit according to some embodiments of the present disclosure.

Reference is made to FIG. 2B. FIG. 2B illustrates a functional block diagram of a projection circuit 200b according to some embodiments of the present disclosure. The projection circuit 200b shown in FIG. 2B differs from the projection circuit 200a shown in FIG. 2A in that the projection circuit 200b shown in FIG. 2B does not have the warp circuit 230. The video signal scaler 220 is coupled to the display driver 240. The video signal scaler 220 may transmit the scaled video signal to the display driver 240. The display driver 240 may drive the digital micro-mirror device 250 in FIG. 2A based on the scaled video signal.

Figure 3:
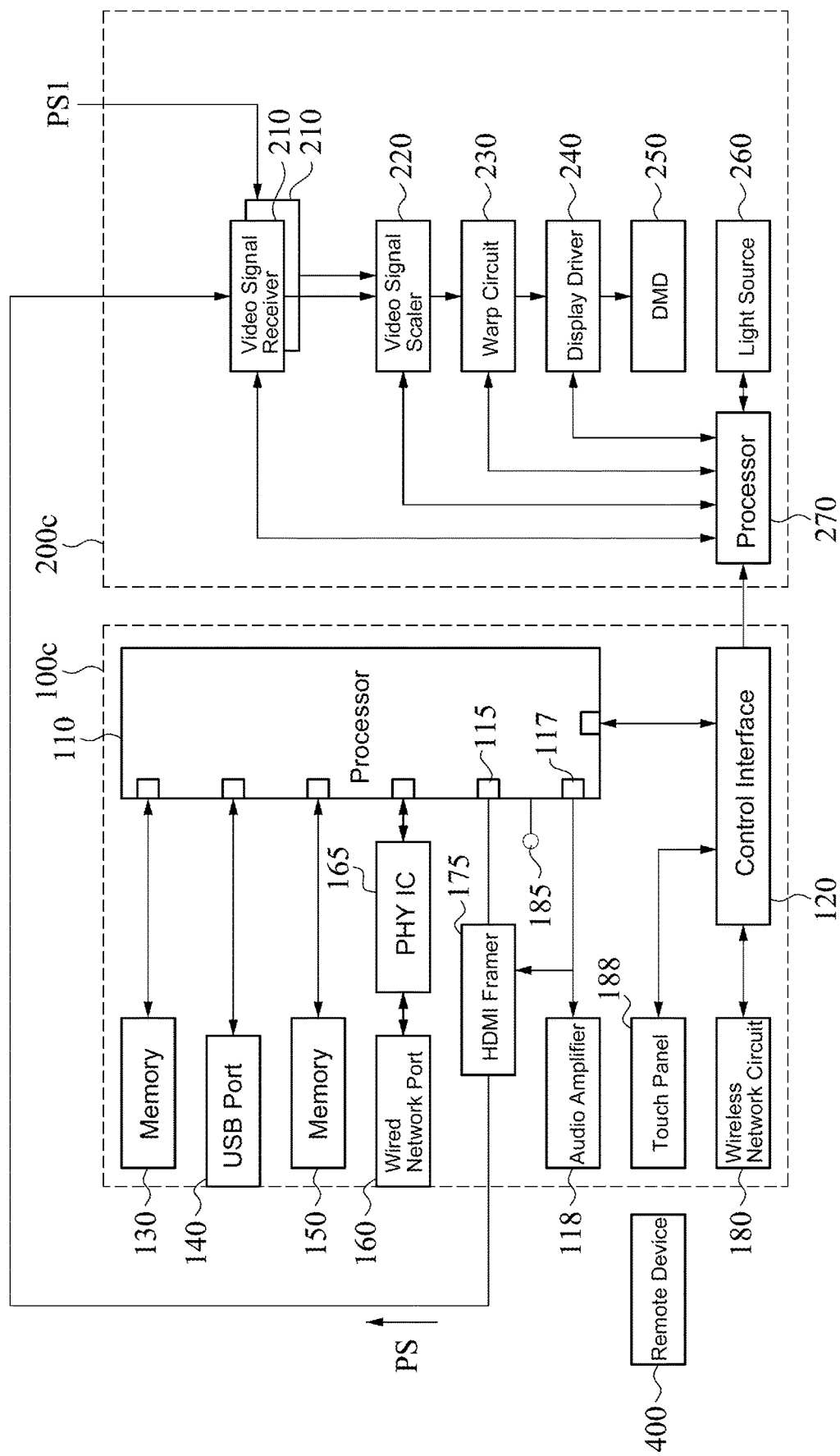
FIG. 3 illustrates a functional block diagram of a projection apparatus according to some embodiments of the present disclosure.

Reference is made to FIG. 3. FIG. 3 illustrates a functional block diagram of a projection apparatus PA3 according to some embodiments of the present disclosure. Similar components in FIG. 3 use the same reference numbers as in FIG. 2A to facilitate understanding. The projection apparatus PA3 shown in FIG. 3 differs from the projection apparatus PA2 shown in FIG. 2A in that a projection circuit 200c shown in FIG. 3 further includes a processor 270. The processor 270 is, for example, a microcontroller unit (MCU). However, the present disclosure is not limited in this regard. The processor 270 is coupled to the control interface 120. The processor 110 of a control circuit 100c may control the video signal receiver 210, the video signal scaler 220, the warp circuit 230, the display driver 240, and the light source 260 in the projection circuit 200c via the control interface 120 and the processor 270. Since the other operations regarding FIG. 3 are similar to those in FIG. 2A, a description in this regard is not provided.

Figure 4:
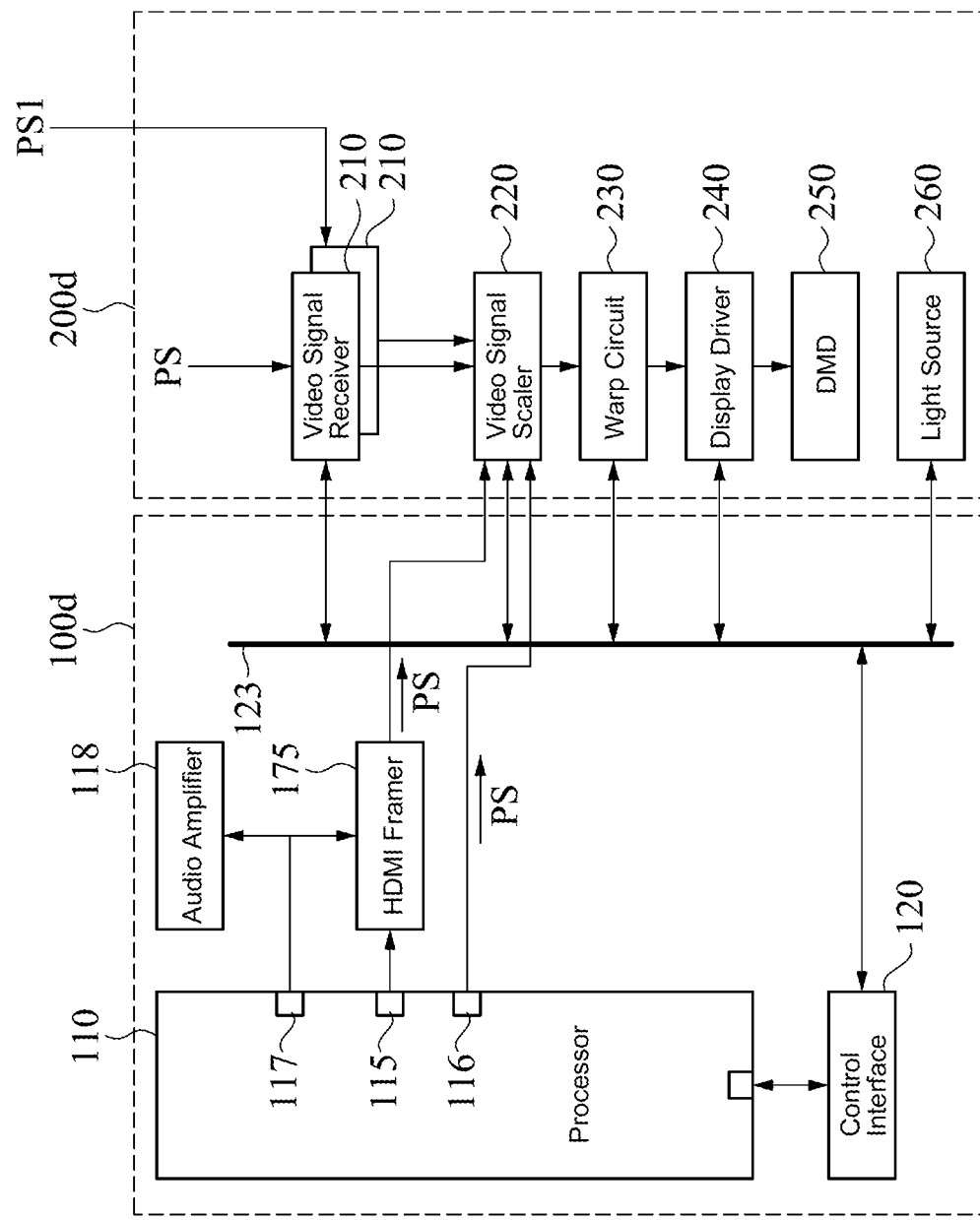
FIG. 4 illustrates a functional block diagram of a projection apparatus according to some embodiments of the present disclosure.

Reference is made to FIG. 4. FIG. 4 illustrates a functional block diagram of a projection apparatus PA4 according to some embodiments of the present disclosure. To facilitate understanding, a control circuit 100d in FIG. 4 only shows part of the components and similar components in FIG. 4 use the same reference numbers as in FIG. 2A. The projection apparatus PA4 shown in FIG. 4 differs from the projection apparatus PA2 shown in FIG. 2A in that an HDMI video signal output by the HDMI framer 175 is transmitted to an HDMI input interface in the video signal scaler 220. In addition, the processor 110 includes a V-by-one output port 116. The V-by-one output port 116 outputs the original video signal PS to a projection circuit 200d according to a V-by-one standard. The original video signal PS is a video signal conforming to the transmission format of the V-by-one standard. In addition, a control circuit 100d further includes a control interface 123. The control interface 123 is coupled to the control interface 120. The processor 110 may control components in the projection circuit 200d via the control interface 120 and the control interface 123. Since the other components and operations regarding FIG. 4 are similar to those in FIG. 2A, a description in this regard is not provided.

Figure 5:
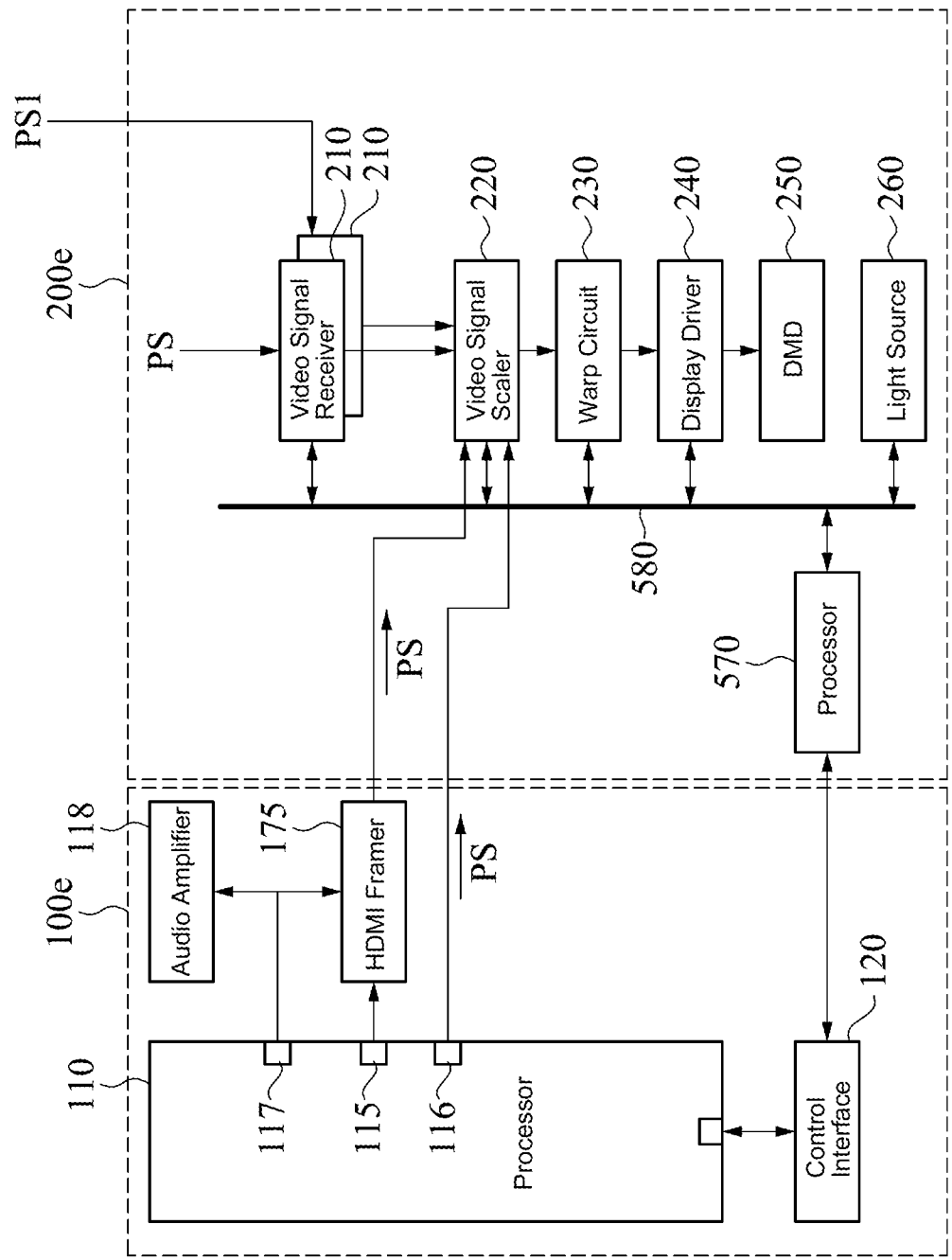
FIG. 5 illustrates a functional block diagram of a projection apparatus according to some embodiments of the present disclosure.

Reference is made to FIG. 5. FIG. 5 illustrates a functional block diagram of a projection apparatus PA5 according to some embodiments of the present disclosure. To facilitate understanding, a control circuit 100e in FIG. 5 only shows part of the components and similar components in FIG. 5 use the same reference numbers as in FIG. 4. The projection apparatus PA5 shown in FIG. 5 differs from the projection apparatus PA4 shown in FIG. 4 in that a projection circuit 200e further includes a processor 570 and a control interface 580. The processor 570 is, for example, a microcontroller unit (MCU). However, the present disclosure is not limited in this regard. The processor 570 is coupled to the control interface 120. The control interface 580 is coupled to the processor 570. The processor 110 controls components in the projection circuit 200e via the control interface 120, the processor 570, and the control interface 580. Since the other components and operations regarding FIG. 5 are similar to those in FIG. 4, a description in this regard is not provided.

Figure 6:
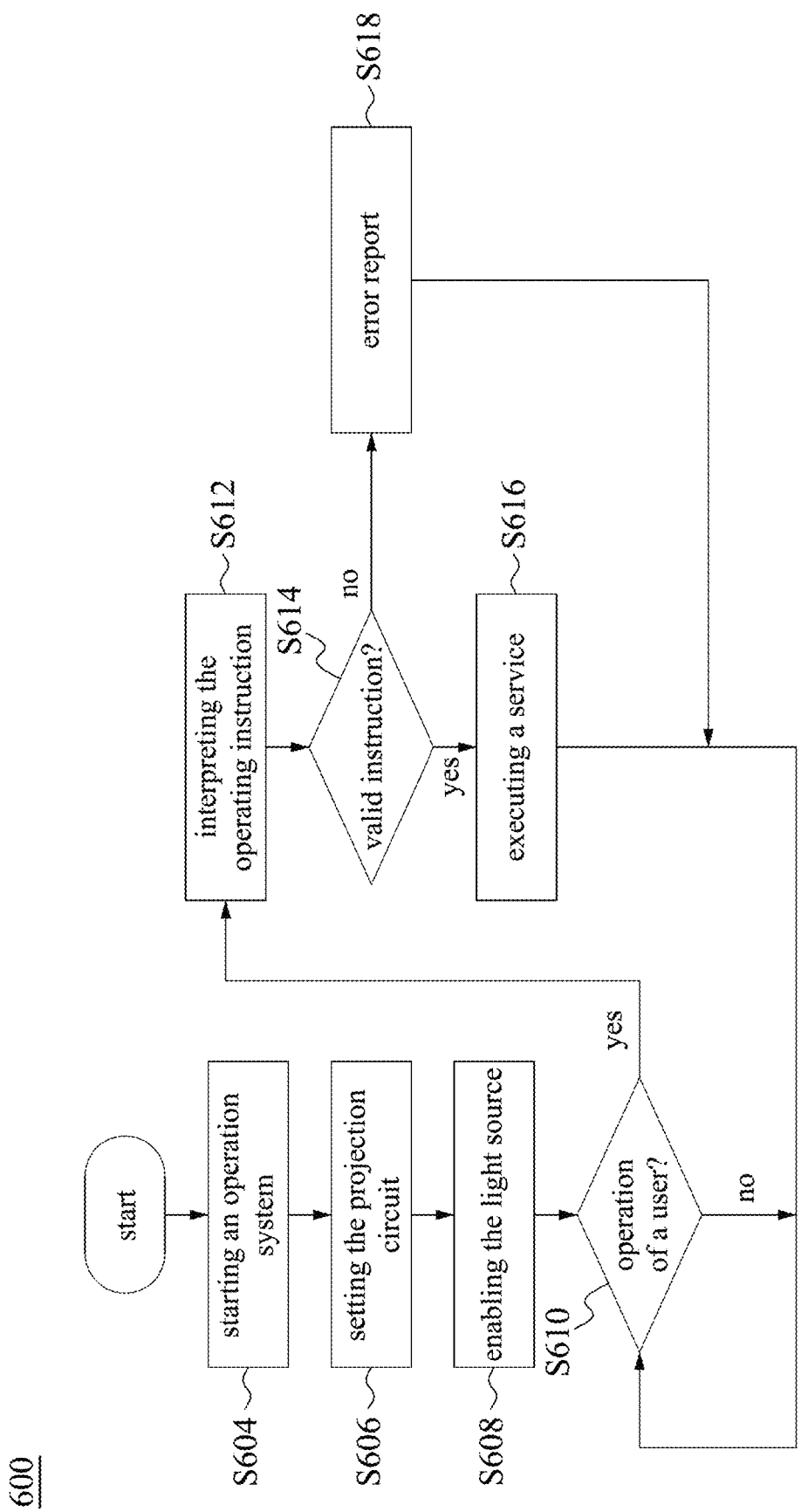
FIG. 6 illustrates a flowchart of an operation method of a projection apparatus according to some embodiments of the present disclosure.

Reference is made to FIG. 6. FIG. 6 illustrates a flowchart of an operation method 600 of a projection apparatus according to some embodiments of the present disclosure. The operation method 600 includes an operation S604, an operation S606, and an operation S608, an operation S610, an operation S612, an operation S614, and an operation S616, and an operation S618. In some embodiments, the operation method 600 is applied to one of the projection apparatuses PA1-PA5 in FIG. 1A and FIG. 2 to FIG. 5, but the present disclosure is not limited in this regard. The operation method 600 is discussed with reference to the projection apparatus PA2 in FIG. 2A to facilitate understanding.

In operation S604, the control circuit 100a is configured to start an operation system. As mentioned previously, the operation system may be an Android system or a Linux system, and is stored in the memory 150. In operation S606, the control circuit 100a is configured to set the projection circuit 200a. As mentioned previously, the processor 110 of the control circuit 100a controls or sets the components in the projection circuit 200a via the control interface 120. In operation S608, the control circuit 100a is configured to enable the light source 260 of the projection circuit 200a. The light source 260 may cooperate with the digital micromirror device 250 to project the projection image PI shown in FIG. 1A. In operation S610, the control circuit 100a is configured to determine whether an operating instruction corresponding to an operation of a user is received or not. In some embodiments, the operation of the user may be received by the remote device 400, the touch panel 188, the wired network port 160, or the wireless network circuit 180. If any of the above components receives the operation of the user, the processor 110 receives the corresponding operating instruction, and the operation method 600 proceeds to operation S612. If the processor 110 does not receive the corresponding operating instruction, the operation method 600 stays at operation S610. In operation S612, the control circuit 100a is configured to interpret the operating instruction so as to determine correctness of the operating instruction of a user. In operation S614, the control circuit 100a is configured to determine whether the operating instruction is a valid operating instruction or not. If yes, the operation method 600 proceeds to operation S616. If not, the operation method 600 proceeds to operation S618. In operation S616, if the control circuit 100a determines that the operating instruction is the valid operating instruction, the control circuit 100a is configured to execute a service correspondingly according to the valid operating instruction. In operation S618, if the control circuit 100a determines that the operating instruction is not the valid operating instruction, and the control circuit 100a is configured to perform an error report to indicate that the operating instruction is an invalid instruction or causes the input instruction to be in a wrong format.

Figure 7:
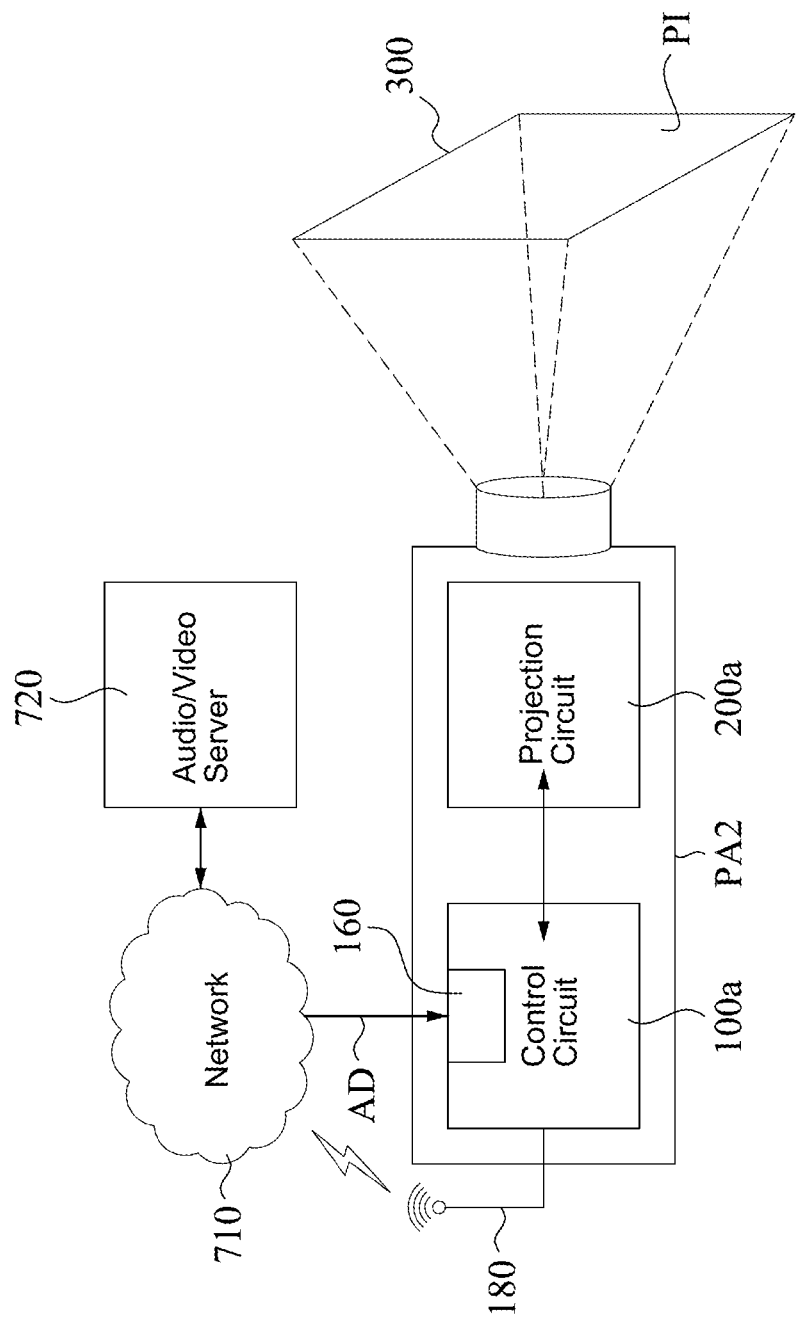
FIG. 7 illustrates a schematic diagram of receiving audio/video data by a projection apparatus according to some embodiments of the present disclosure.

Reference is made to FIG. 7. FIG. 7 illustrates a schematic diagram of receiving audio/video data AD by the projection apparatus PA2 according to some embodiments of the present disclosure. In some embodiments, any one of the projection apparatuses PA1-PA5 in FIG. 1A and FIG. 2 to FIG. 5 may receive the audio/video data AD. FIG. 7 is discussed with reference to the projection apparatus PA2 in FIG. 2A to facilitate understanding.

As shown in FIG. 7, the projection apparatus PA2 may be connected to a network 710 via the wired network port 160 or the wireless network circuit 180 of the control circuit 100a. The projection apparatus PA2 is connected to an audio/video server 720 via the network 710 so as to receive the audio/video data AD. The control circuit 100a may run an operation system to interpret the audio/video data AD. Then, the projection circuit 200a may project the projection image PI on the screen 300 based on interpreted audio/video data AD. The audio/video server 720 is, for example, a YouTube server or a Netflix server, but the present disclosure is not limited in this regard. In some embodiments, the audio/video data AD may be stored in the memory 150 in FIG. 2A in advance. Accordingly, when the projection apparatus PA2 may not be connected to the network, the projection image PI may still be projected based on the audio/video data AD in the memory 150.

Figure 8:
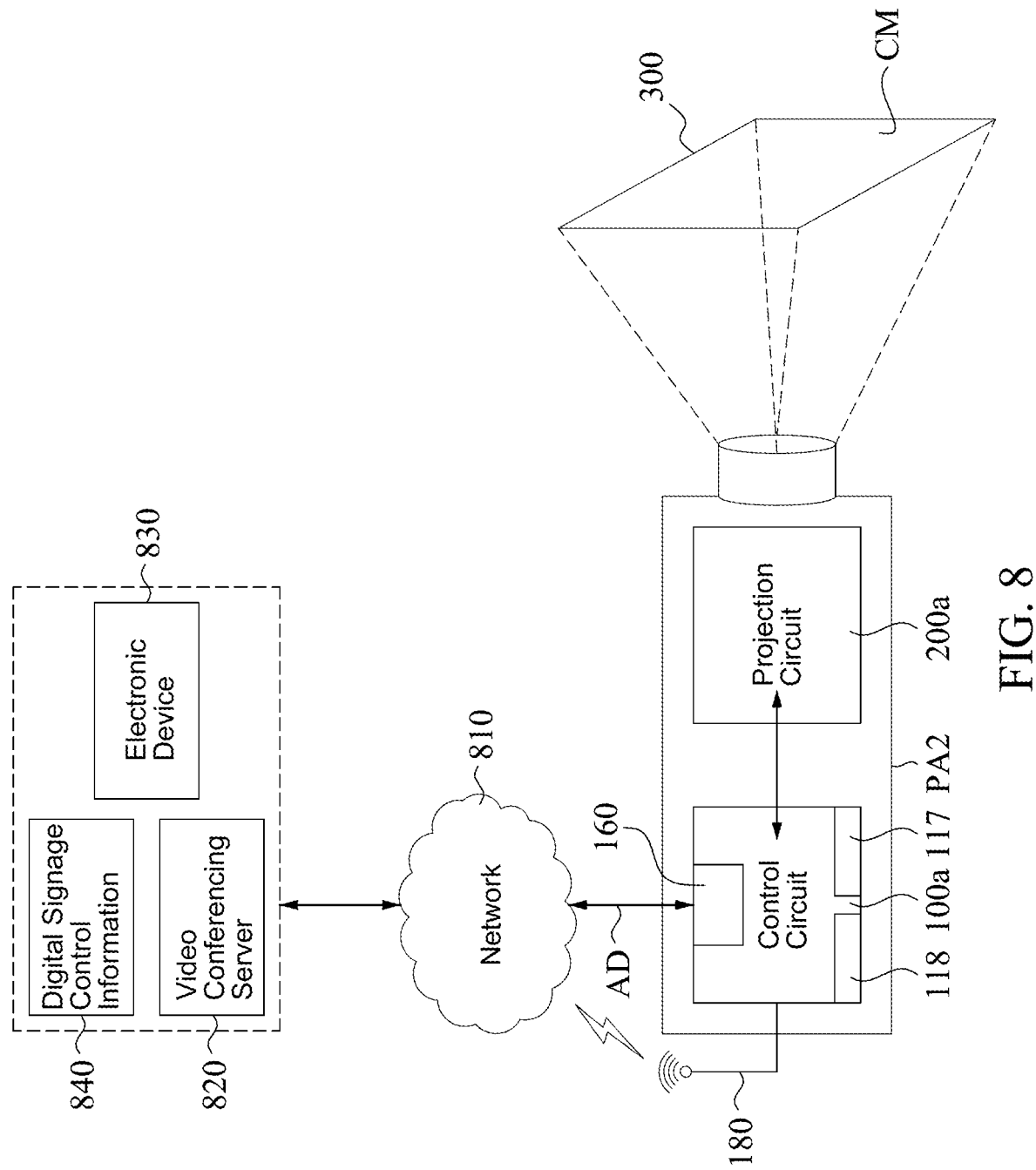
FIG. 8 illustrates a schematic diagram of executing a digital signage service and a video conferencing service by a projection apparatus according to some embodiments of the present disclosure.

Reference is made to FIG. 8. FIG. 8 illustrates a schematic diagram of executing a digital signage service and a video conferencing service by the projection apparatus PA2 according to some embodiments of the present disclosure. In some embodiments, any one of the projection apparatuses PA1-PA5 in FIG. 1A and FIG. 2 to FIG. 5 may execute the digital signage service and the video conferencing service. FIG. 8 is discussed with reference to the projection apparatus PA2 in FIG. 2A to facilitate understanding. As shown in FIG. 8, the projection apparatus PA2 may be connected to a network 810 via the wired network port 160 or the wireless network circuit 180 of the control circuit 100a, and is connected to a video conferencing server 820 via the network 810. For example, the control circuit 100a may run a video conferencing application (APP) to connect to the video conferencing server 820 via the network 810. The projection circuit 200a may project a video conferencing picture CM on the screen 300 according to the video conferencing service provided by the video conferencing server 820. For example, the control circuit 100a may run a video decoding and playback software (such as H.264/H.265) to control the projection circuit 200a to project a decoded video conferencing picture CM. Thus, the projection apparatus PA2 may be used for performing video conferencing. In addition, the projection apparatus PA2 may also be connected to an electronic device 830 (such as a computer or a smart phone) via the network 810 to receive video conferencing data from the electronic device 830. The projection apparatus PA2 may project the video conferencing picture CM on the screen 300 based on the video conferencing data.

Figure 9A:
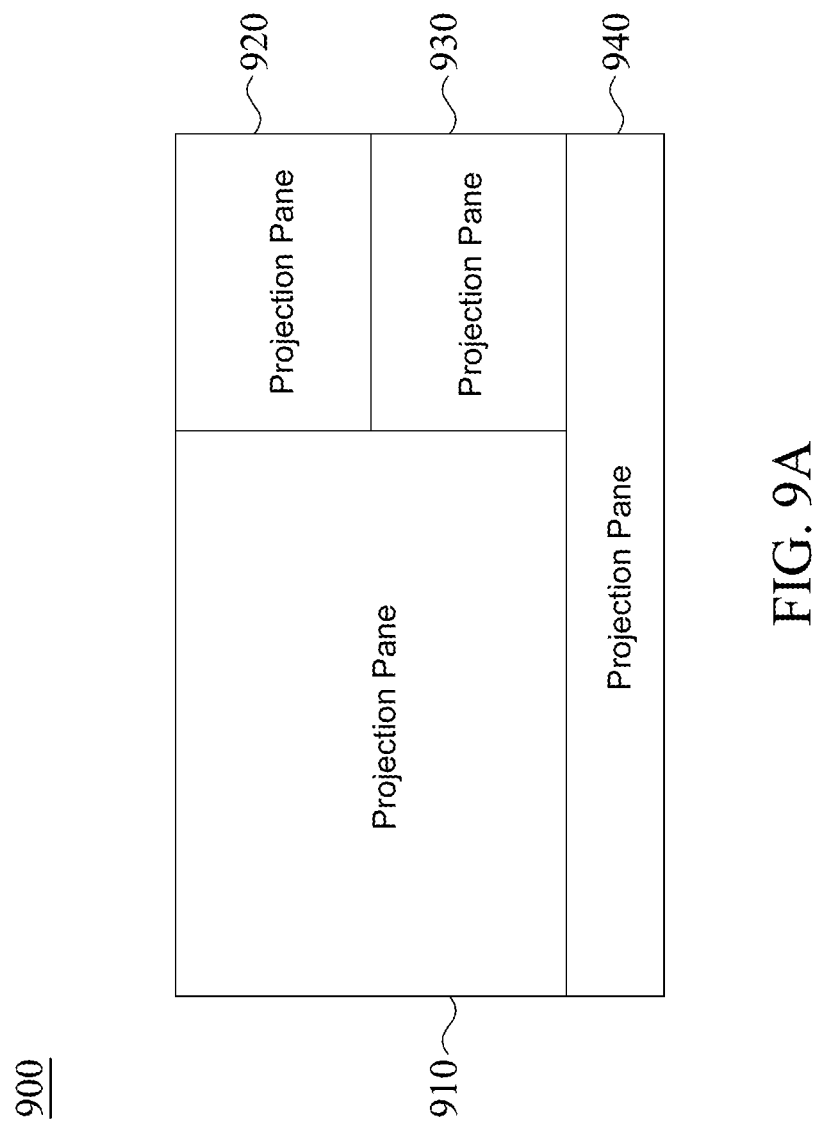
FIG. 9A illustrates a schematic diagram of a digital signage according to some embodiments of the present disclosure.

In some embodiments, the projection apparatus PA2 may also receive digital signage control information 840 via the network 810. In some embodiments, the digital signage control information 840 includes pane configuration information and playlist information. The control circuit 100a may control the projection circuit 200a to project a projection image according to the pane configuration information and the playlist information of the digital signage control information 840. Reference is made to FIG. 9A. FIG. 9A illustrates a schematic diagram of a digital signage 900 according to some embodiments of the present disclosure. As shown in FIG. 9A, the projection image projected by the projection circuit 200a according to the digital signage control information 840 includes a plurality of projection panes 910, 920, 930, and 940. Any one of the projection panes is independent of any other of the projection panes. For example, the projection pane 910 is configured to project an online video, the projection pane 920 is configured to project a weather website, the projection pane 930 is configured to project a two-dimensional barcode image, and the projection pane 940 is configured to project a social networking site. In some other embodiments, at least one of the projection panes 910, 920, 930, and 940 may project a video file previously stored in the memory 150.

Figure 9B:
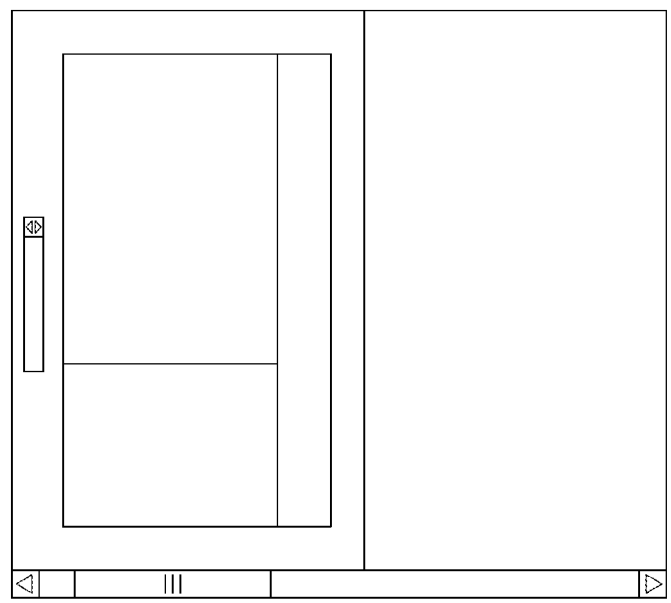
FIG. 9B illustrates a schematic diagram of various configurations of a digital signage according to some embodiments of the present disclosure.
Figure 9B:
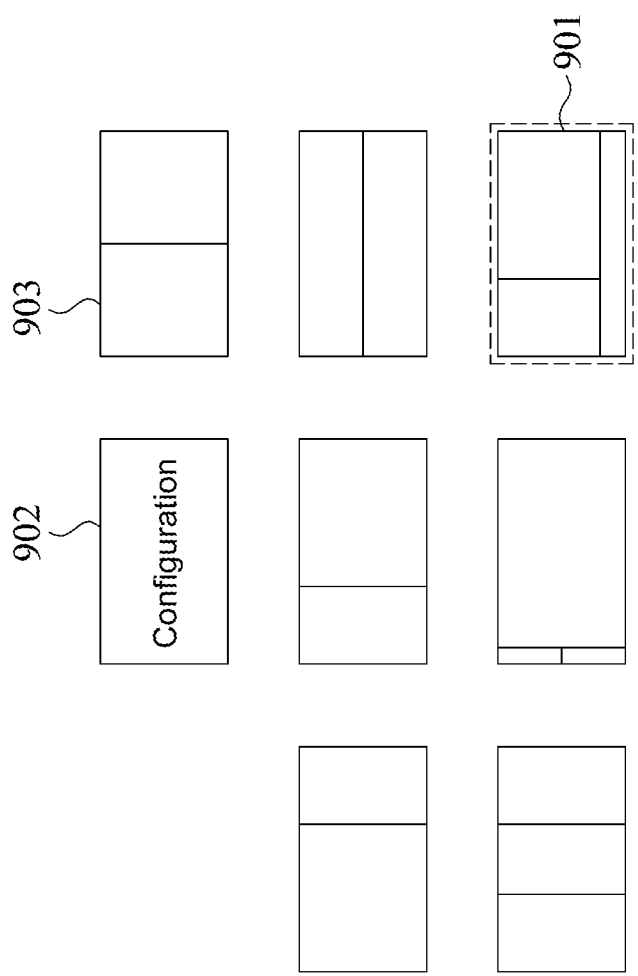

Reference is made to FIG. 9B. FIG. 9B illustrates a schematic diagram of various configurations of a digital signage according to some embodiments of the present disclosure. In some embodiments, the configuration of a plurality of panes in the digital signage 900 in FIG. 9A may be adjusted depending on needs. As shown in FIG. 9B, with a configuration 901 as an example, the configuration 901 includes three projection panes. Two of them are located on the top, and the left-sided one is narrow and the right-sided one is wide. One of them is located on the bottom. In addition, with a configuration 902 as an example, the configuration 902 includes a single projection pane. In addition, with a configuration 903 as an example, the configuration 903 includes two projection panes. One of them is located on the left side, and the other one is located on the right side.

Figure 10:
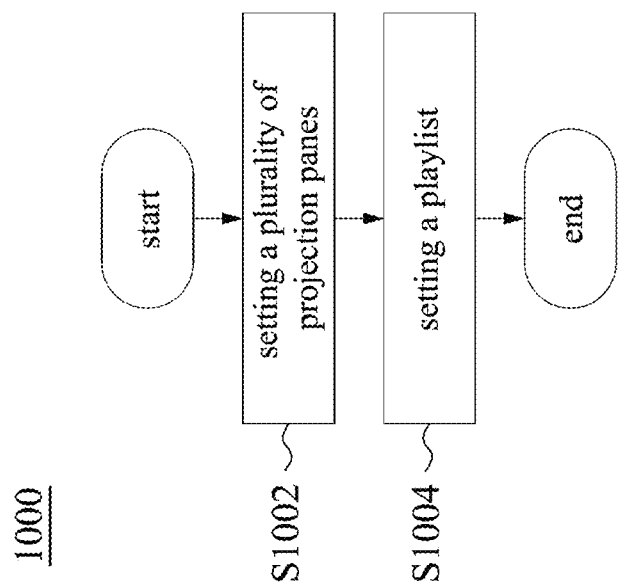
FIG. 10 illustrates a flowchart of a method of setting digital signage control information according to some embodiments of the present disclosure.

Reference is made to FIG. 10. FIG. 10 illustrates a flowchart of a method 1000 of setting the digital signage control information 840 according to some embodiments of the present disclosure. As shown in FIG. 10, the method 1000 includes an operation S1002 and an operation S1004. In operation S1002, a plurality of projection panes are configured to generate the above pane configuration information. In operation S1004, a playlist is set to generate the above playlist information. Thus, the digital signage control information 840 may be generated according to the pane configuration information and the playlist information.

Figure 11A:
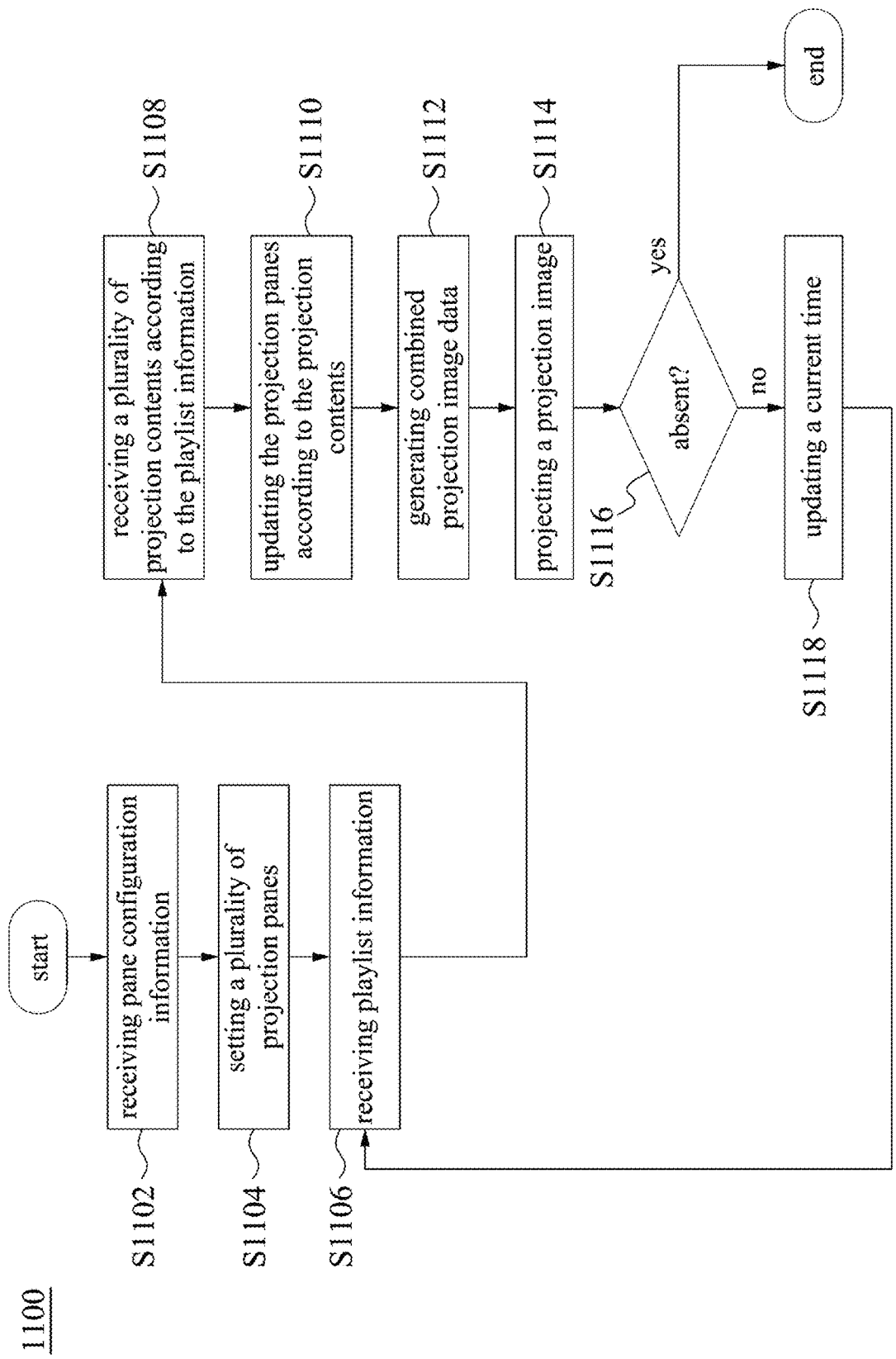
FIG. 11A illustrates a flowchart of a method of executing a digital signage service by a projection apparatus according to some embodiments of the present disclosure.

Reference is made to FIG. 11A. FIG. 11A illustrates a flowchart of a method 1100 of executing a digital signage service by the projection apparatus PA2 according to some embodiments of the present disclosure. In some embodiments, any one of the projection apparatuses PA1-PA5 in FIG. 1A and FIG. 2 to FIG. 5 may execute the digital signage service. FIG. 11A is discussed with reference to the projection apparatus PA2 in FIG. 2A to facilitate understanding. As shown in FIG. 11A, the method 1100 includes an operation S1102, an operation S1104, an operation S1106, an operation S1108, an operation S1110, an operation S1112, an operation S1114, an operation S1116, and an operation S1118. In operation S1102, the control circuit 100a receives the pane configuration information. In some embodiments, the digital signage control information 840 is from a server or stored in a local memory. In operation S1104, the control circuit 110a sets a plurality of projection panes (such as the projection panes 910, 920, 930, and 940 in FIG. 9A) according to the pane configuration information. In operation S1106, the control circuit 100a receives the playlist information. In operation S1108, the control circuit 100a receives a plurality of projection contents according to the playlist information. The projection contents may be from a website or from the memory 150 in FIG. 2A. In operation S1110, the control circuit 100a updates the projection panes (such as the projection panes 910, 920, 930, and 940 in FIG. 9A) according to the projection contents. In operation S1112, the control circuit 100a combines the projection contents of the projection panes to generate combined projection image data. For example, the control circuit 100a may combine the projection contents according to positions of the projection panes based on the pane configuration information to generate the combined projection image data. In operation S1114, the projection circuit 200a projects a projection image based on the combined projection image data. In operation S1116, it is determined whether a user is absent or not. If the user is not absent, the method 1100 proceeds to operation S1118. In operation S1118, a current time is updated and the method 1100 returns to operation S1106. After that, the control circuit 100a will update the playlist information according to the current time.

Reference is made to FIG. 11B. FIG. 11B illustrates a schematic diagram of a playlist LST according to some embodiments of the present disclosure. As shown in FIG. 11B, the playlist LST includes pane information D1, time information D2, name information D3, and source information D4. The pane information D1 is configured to indicate each of projection panes. The time information D2 is configured to set time slots of each of the projection panes. The name information D3 is configured to set a name of each of time slots. The source information D4 is configured to set a source of a video, a picture, or a signal. The source may be information of an external website, such as a source d41. The source may be internally stored information (for example: stored in the memory 150 in FIG. 2A or FIG. 3), such as a source d42.

Figure 12:
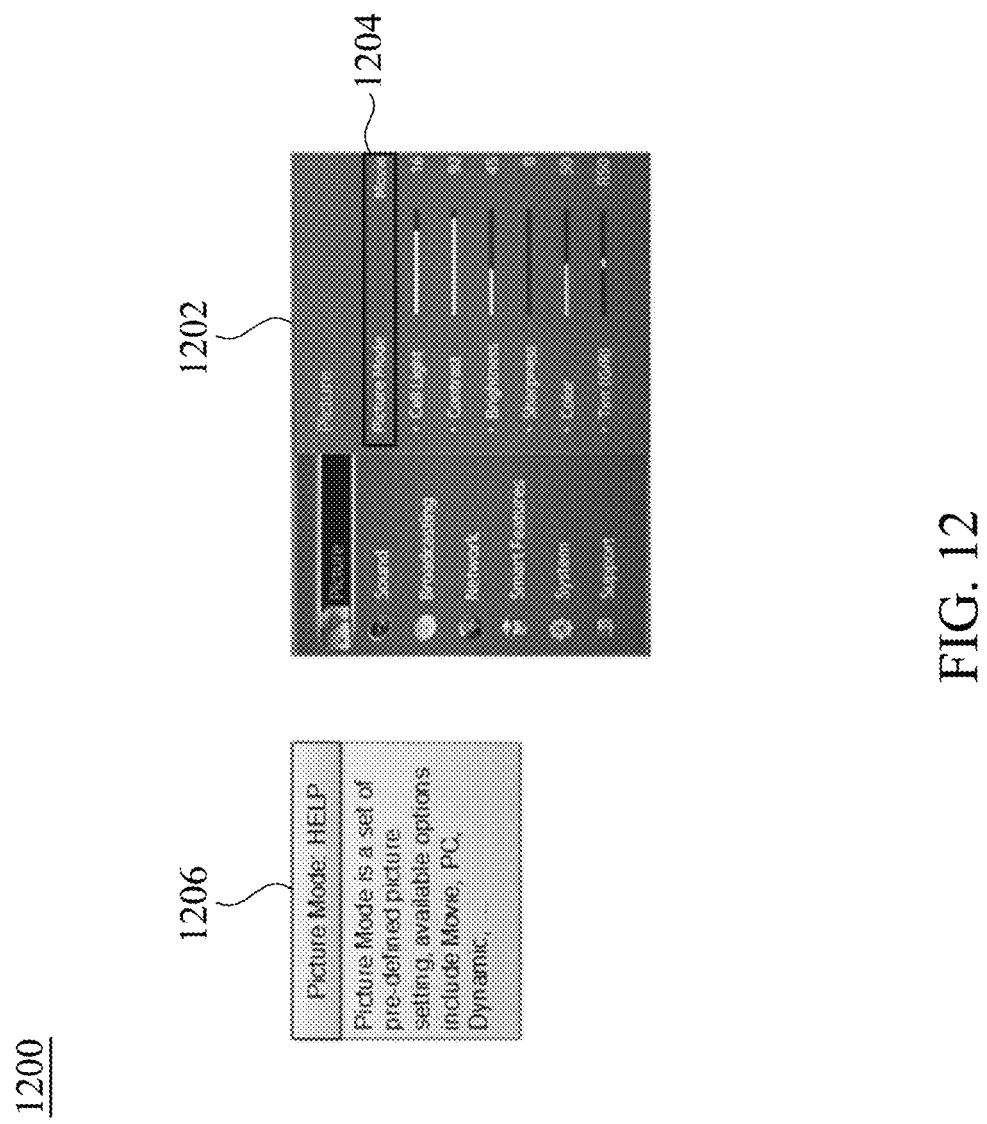
FIG. 12 illustrates a picture related to user manual data projected by a projection apparatus according to some embodiments of the present disclosure.

Reference is made to FIG. 12. FIG. 12 illustrates a picture 1200 related to user manual data projected by the projection apparatus PA2 according to some embodiments of the present disclosure. In some embodiments, any one of the projection apparatuses PA1-PA5 in FIG. 1A and FIG. 2 to FIG. 5 may project the picture 1200. FIG. 12 is discussed with reference to the projection apparatus PA2 in FIG. 2A to facilitate understanding. In some embodiments, the user manual data is stored in the memory 150 in FIG. 2A. The user manual data is configured to allow a user to understand functions or setting methods of the projection device PA2. The projection circuit 200a may project explanatory text 1206 or an animation corresponding to an option 1204 based on the user manual data and the option 1204 in a user menu 1202. For example, when the user presses an instruction button, a projection image of the projection apparatus PA2 may display the user menu 1202 for the user to select. When the user selects the option 1204, the control circuit 100a may find the explanatory text 1206 or the animation corresponding to the option 1204 from the user manual data. The projection circuit 200a may project the explanatory text 1206 or the animation. Thus, the user may understand the functions or the setting methods of the projection apparatus PA2 via the explanatory text 1206 or the animation. In some embodiments, the explanatory text 1206 and the animation are stored in the memory 150 in FIG. 2A or FIG. 3, and the explanatory text 1206 and the animation may be updated based on an Internet-connection function (wireless or wired) of the control circuit 100a.

Figure 13:
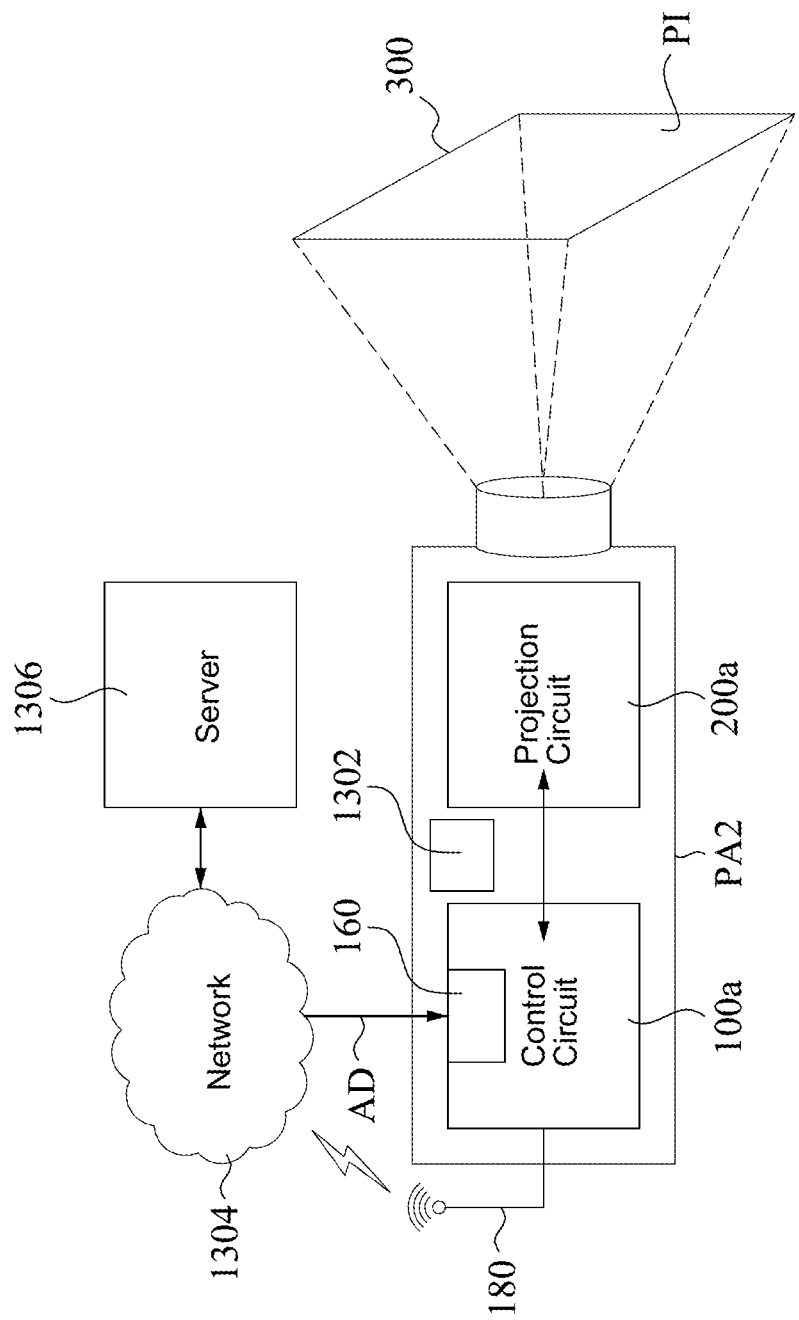
FIG. 13 illustrates a schematic diagram of a projection apparatus having a sensor according to some embodiments of the present disclosure.

Reference is made to FIG. 13. FIG. 13 illustrates a schematic diagram of the projection apparatus PA2 having a sensor 1302 according to some embodiments of the present disclosure. In some embodiments, any one of the projection apparatuses PA1-PA5 in FIG. 1A and FIG. 2 to FIG. 5 may include the sensor 1302. FIG. 13 is discussed with reference to the projection apparatus PA2 in FIG. 2A to facilitate understanding. The sensor 1302 may detect the projection apparatus PA1 to generate detected data. As shown in FIG. 13, the projection apparatus PA2 may include the sensor 1302. The sensor 1302 may be, for example, a temperature sensor, a pressure (altitude) sensor, a gyroscope, or various other sensors. Correspondingly, the detected data may be temperature, pressure, a direction of the projection apparatus PA2, an angle of the projection apparatus PA2, or various other detected data. The projection apparatus PA2 may transmit the detected data to a server 1306 via the wired network port 160 or the wireless network circuit 180 of the control circuit 100a by way of a network 1304. Thus, the server 1306 may collect relevant data of the projection apparatus PA2 for reference by maintenance personnel or as a basis for subsequent product improvement. In some other embodiments, the control circuit 100a may run a cloud intelligent service, such as a voice recognition service, to control the projection apparatus PA2 by means of voice control. Additionally, the projection apparatus PA2 may also transmit its usage status, the number of operating hours, the number of hours of the light source 206, or various other data to the server 1306 via the network 1304. The server 1306 may perform statistics or analysis on the data for reference by the maintenance personnel or as a basis for subsequent product improvement.

Figure 14:
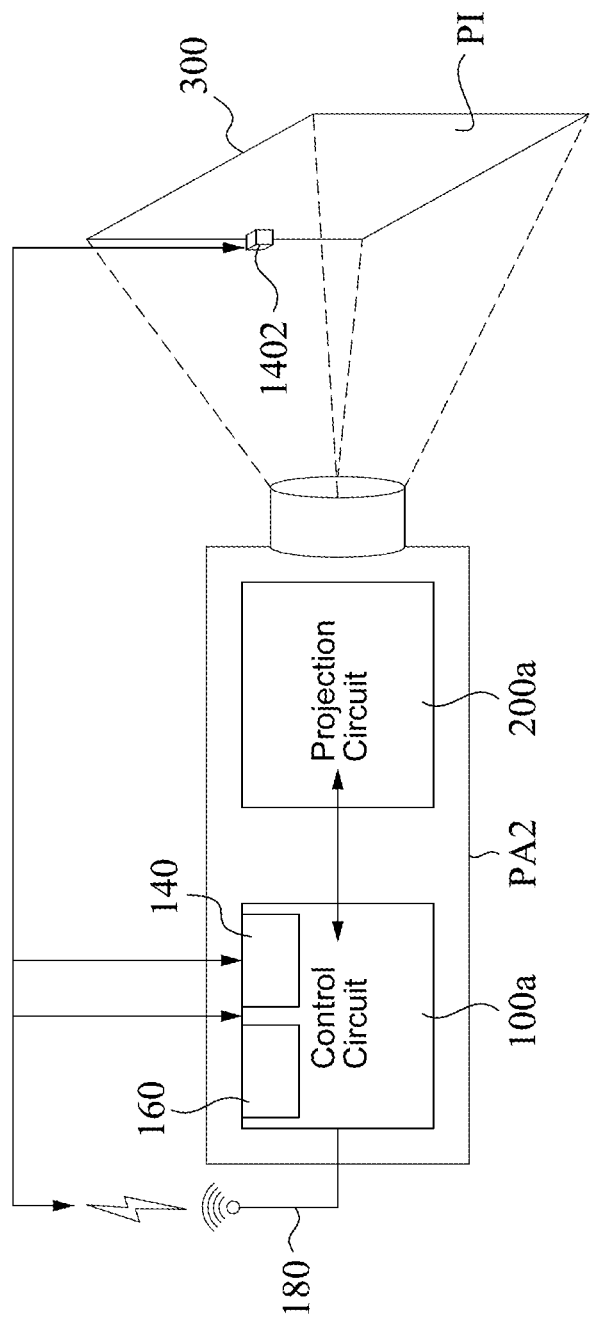
FIG. 14 illustrates a schematic diagram of automatic adjustment of a projection apparatus based on detected data of a screen according to some embodiments of the present disclosure.

Reference is made to FIG. 14. FIG. 14 illustrates a schematic diagram of automatic adjustment of the projection apparatus PA2 based on detected data of the screen 300 according to some embodiments of the present disclosure. In some embodiments, any one of the projection apparatuses PA1-PA5 in FIG. 1A and FIG. 2 to FIG. 5 may adjust automatically based on the detected data of the screen 300. FIG. 14 is discussed with reference to the projection apparatus PA2 in FIG. 2A to facilitate understanding. As shown in FIG. 14, a sensor 1402 is disposed on the screen 300. The sensor 1402 may generate the detected data of the screen 300. For example, the sensor 1402 may be a brightness sensor, and is configured to detect brightness of the screen 300 to generate brightness data. The detected data may be transmitted to the control circuit 100a of the projection apparatus PA2 via the universal serial bus port 140, the wired network port 160, or the wireless network circuit 180. The processor 110 of the control circuit 100a will adjust the projection image PI based on the detected data. For example, the processor 110 may perform a High Dynamic Range (HDR) function or perform an automatic tone scale adjustment function based on the Digital Imaging and Communications in Medicine (DICOM) to adjust the projection image PI. In this manner, the projection image PI is more suitable for a user to view.

Figure 15:
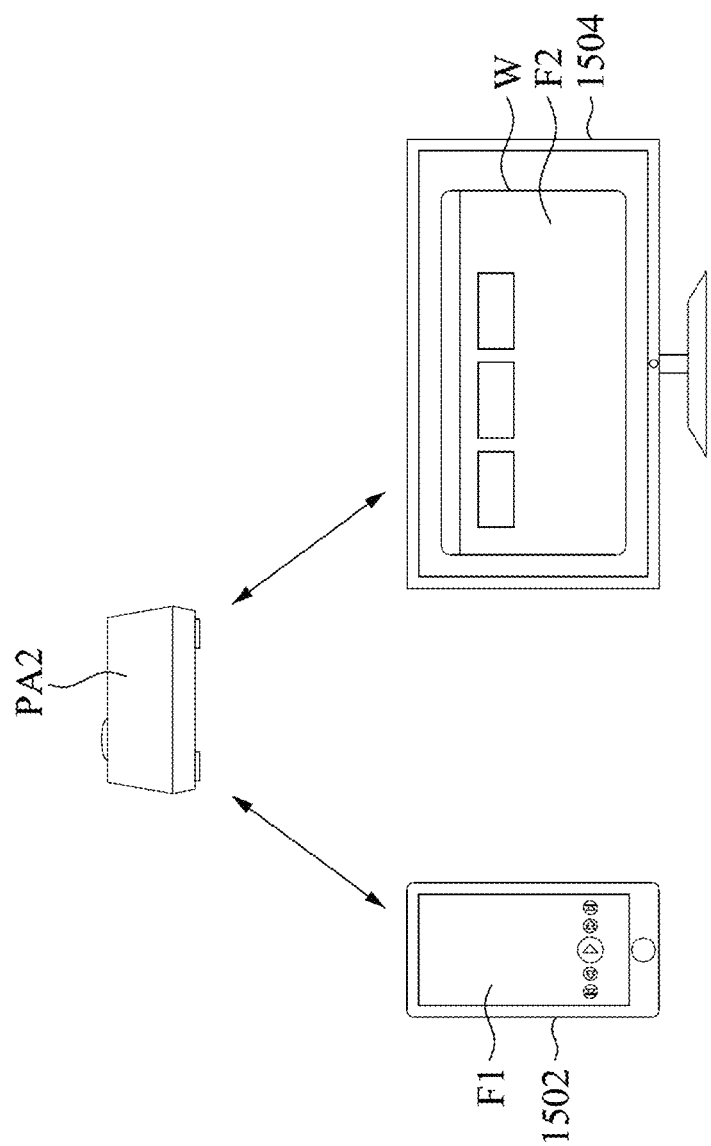
FIG. 15 illustrates a schematic diagram of a graphical user interface related to a projection apparatus according to some embodiments of the present disclosure.

Reference is made to FIG. 15. FIG. 15 illustrates a schematic diagram of a graphical user interface F1 related to the projection apparatus PA2 according to some embodiments of the present disclosure. In some embodiments, any one of the projection apparatuses PA1-PA5 in FIG. 1A and FIG. 2 to FIG. 5 may be controlled via the graphical user interface F1. FIG. 15 is discussed with reference to the projection apparatus PA2 in FIG. 2A to facilitate understanding. As shown in FIG. 15, a user may control the projection apparatus PA2 by operating an electronic device 1502 or an electronic device 1504. The electronic device 1502 is, for example, a smart phone. The electronic device 1504 is, for example, a desktop computer, a notebook computer, or a tablet computer. However, the present disclosure is not limited in this regard. For example, when the electronic device 1502 runs an application (APP) to display the graphical user interface F1, the user may operate on the graphical user interface F1. At this time, the electronic device 1502 will generate an operating instruction correspondingly. The control circuit 100a of the projection apparatus PA2 receives the operating instruction, and controls the control circuit 100a or the projection circuit 200a according to the operating instruction. In some other embodiments, the electronic device 1504 may be configured to display a web page W, and the web page W includes a graphical user interface F2. Similarly, the user may operate on the graphical user interface F2. At this time, a computer or some other electronic device will generate an operating instruction correspondingly. The control circuit 100a of the projection apparatus PA2 receives the operating instruction, and controls the control circuit 100a or the projection circuit 200a according to the operating instruction. Thus, the user may utilize a smart phone, a computer, or some other electronic device to control the projection apparatus PA2 via the graphical user interface F1 (App-based GUI) or F2 (Web-based GUI) without using a specific remote control device. The memory space in the projection apparatus PA2 originally used for storing control related instructions or interfaces may be released to store user manual data or other files. In addition, the graphical user interface F1 or F2 may be designed based on the operation system (such as Android system). Thus, the designs of the graphical user interface F1 and F2 may be standardized and reapplied to different projection apparatuses. In addition, complex functions may also be implemented on the graphical user interface F1 and the graphical user interface F2.

Figure 16:
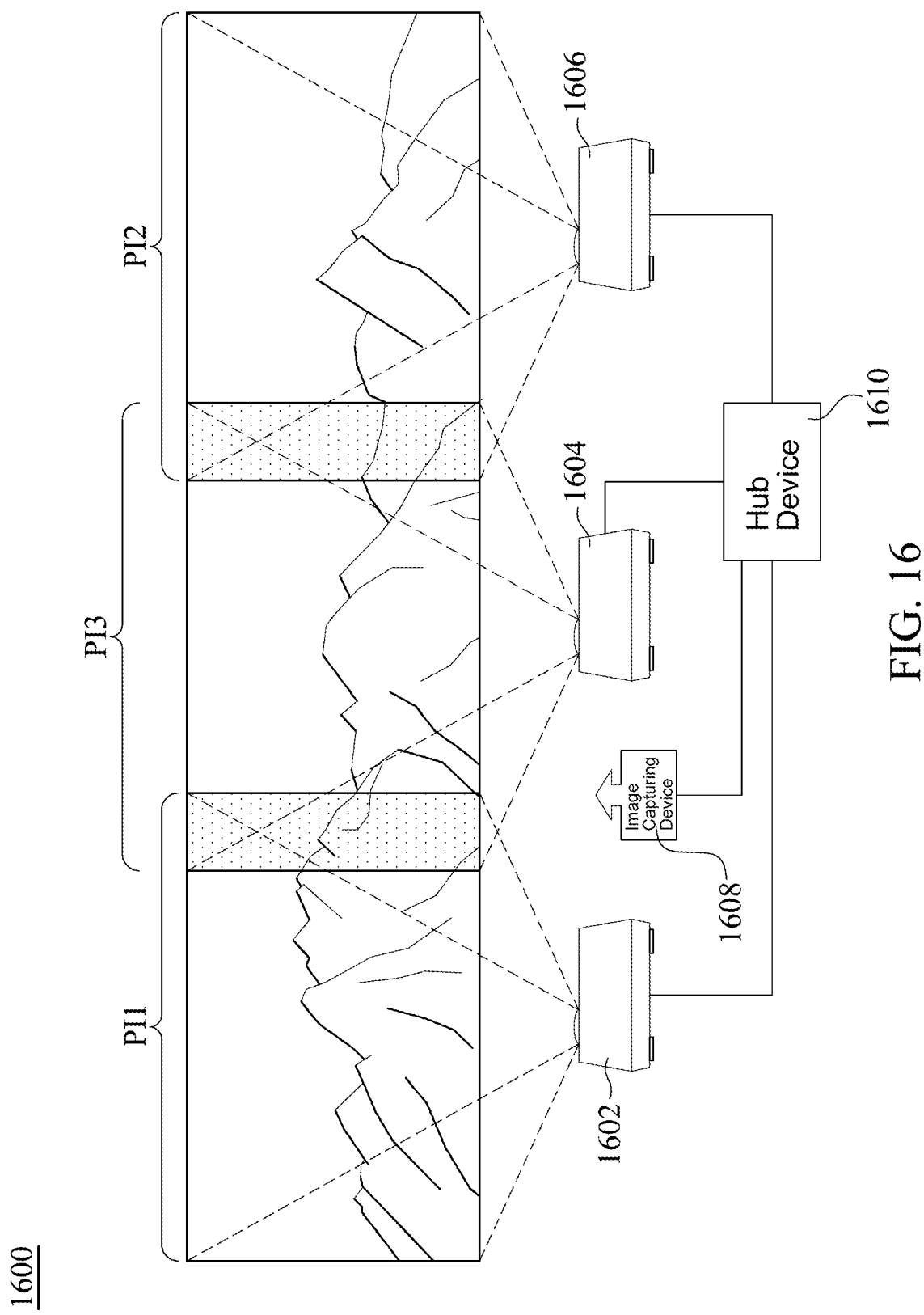
FIG. 16 illustrates a schematic diagram of a projection system according to some embodiments of the present disclosure.

Reference is made to FIG. 16. FIG. 16 illustrates a schematic diagram of a projection system 1600 according to some embodiments of the present disclosure. As shown in FIG. 16, the projection system 1600 includes a projection apparatus 1602, a projection apparatus 1604, a projection apparatus 1606, an image capturing device 1608, and a hub device 1610. Each of the projection apparatus 1602, the projection apparatus 1604, the projection apparatus 1606, and the image capturing device 1608 may be coupled to the hub device 1610 by using a wireless or wired method. The number of projection apparatuses in the projection system 1600 described above is merely an example, and various applicable numbers are within the scope of the present disclosure. In some embodiments, the projection apparatus 1602 is the projection apparatus PA2 in FIG. 2. The projection apparatus 1602, the projection apparatus 1604, and the projection apparatus 1606 may project test images first. The image capturing device 1608 captures the test images. Then, the test images are transmitted to the projection apparatus 1602 via the hub device 1610. A processor of the projection apparatus 1602 (such as the processor 110 in FIG. 2A) analyzes the test images to adjust or set the projection apparatus 1602, the projection apparatus 1604, and the projection apparatus 1606. For example, the processor of the projection apparatus 1602 (such as the processor 110 in FIG. 2A) will generate a plurality of edge blending parameters or a plurality of geometry adjustment parameters of the projection apparatus 1602, the projection apparatus 1604, and the projection apparatus 1606 based on the test images. The processor of the projection apparatus 1602 (such as the processor 110 in FIG. 2A) will set the projection apparatus 1602, the projection apparatus 1604, and the projection apparatus 1606 according to the edge blending parameters or geometry adjustment parameters. Thus, a projection image PI1 projected by the projection apparatus 1602, a projection image PI2 projected by the projection apparatus 1604, and a projection image PI3 projected by the projection apparatus 1606 can be better blended together and a large projection image can be generated.

Figure 17:
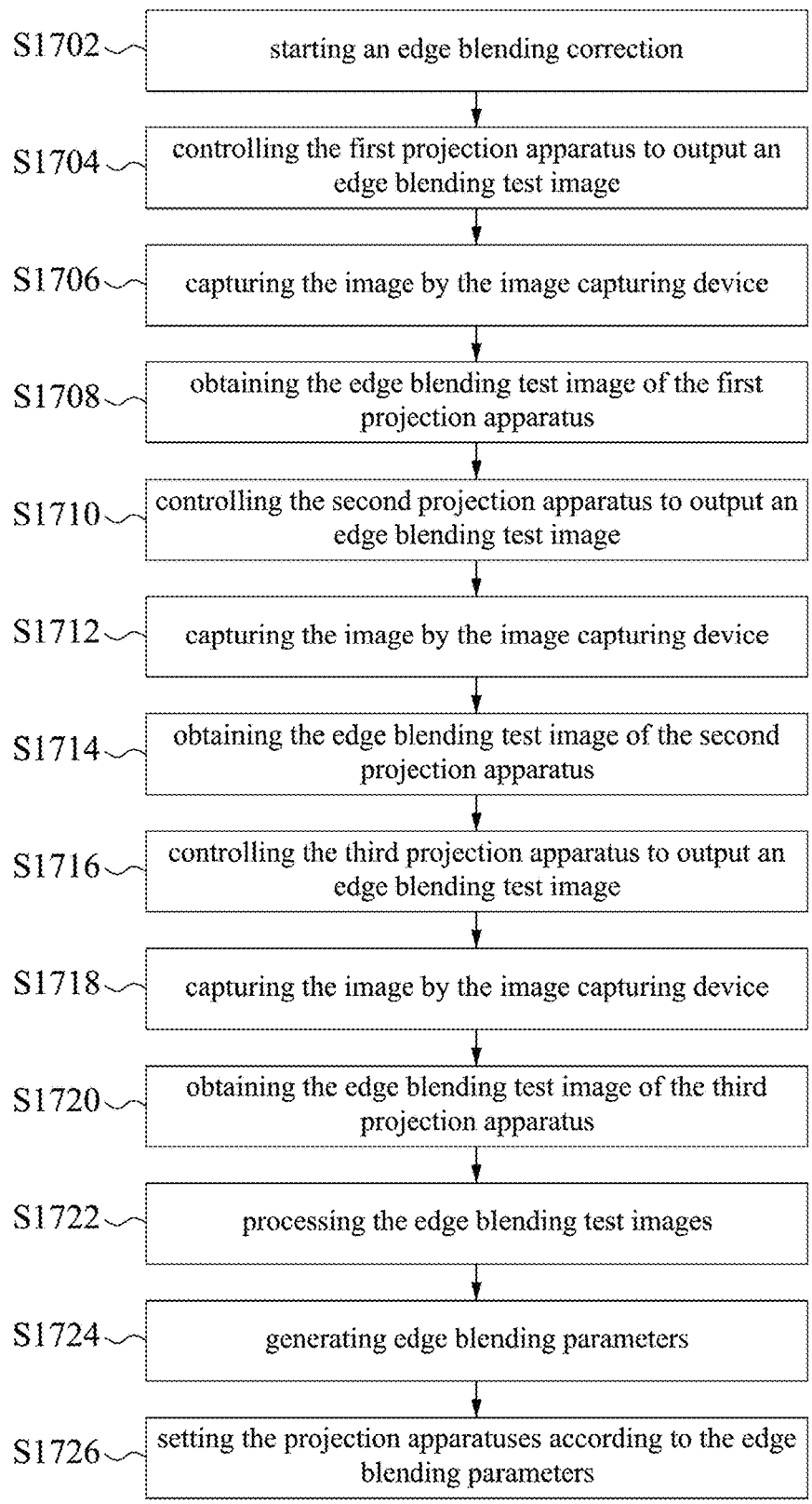
FIG. 17 illustrates a flowchart of a method of setting edge blending parameters by a projection system according to some embodiments of the present disclosure.

Reference is made to FIG. 17. FIG. 17 illustrates a flowchart of a method 1700 of setting edge blending parameters by the projection system 1600 according to some embodiments of the present disclosure. The method 1700 includes an operation S1702, an operation S1704, an operation S1706, an operation S1708, an operation S1710, an operation S1712, an operation S1714, an operation S1716, an operation S1718, an operation S1720, an operation S1722, an operation S1724, and an operation S1726. The method 1700 is discussed with reference to FIG. 16 to facilitate understanding. In operation S1702, edge blending correction is started. In operation S1704, the projection apparatus 1602 is controlled to output an edge blending test image. The edge blending test image is, for example, an all-white test image. In operation S1706, the image capturing device 1608 captures the edge blending test image of the projection apparatus 1602. In operation S1708, the edge blending test image of the projection apparatus 1602 is obtained. In operation S1710, the projection apparatus 1604 is controlled to output an edge blending test image. In operation S1712, the image capturing device 1608 captures the edge blending test image of the projection apparatus 1604. In operation S1714, the edge blending test image of the projection apparatus 1604 is obtained. In operation S1716, the projection apparatus 1606 is controlled to output an edge blending test image. In operation S1718, the image capturing device 1608 captures the edge blending test image of the projection apparatus 1606. In operation S1720, the edge blending test image of the projection apparatus 1606 is obtained. In operation S1722, the edge blending test images of the projection apparatus 1602, the projection apparatus 1604, and the projection apparatus 1606 are processed. In operation S1724, edge blending parameters of the projection apparatus 1602, the projection apparatus 1604, and the projection apparatus 1606 are generated. In operation S1726, the projection apparatus 1602, the projection apparatus 1604, and the projection apparatus 1606 are set according to the edge blending parameters. Thus, the edge blending process of projection images of a plurality of projection apparatuses can be completed.

Figure 18:
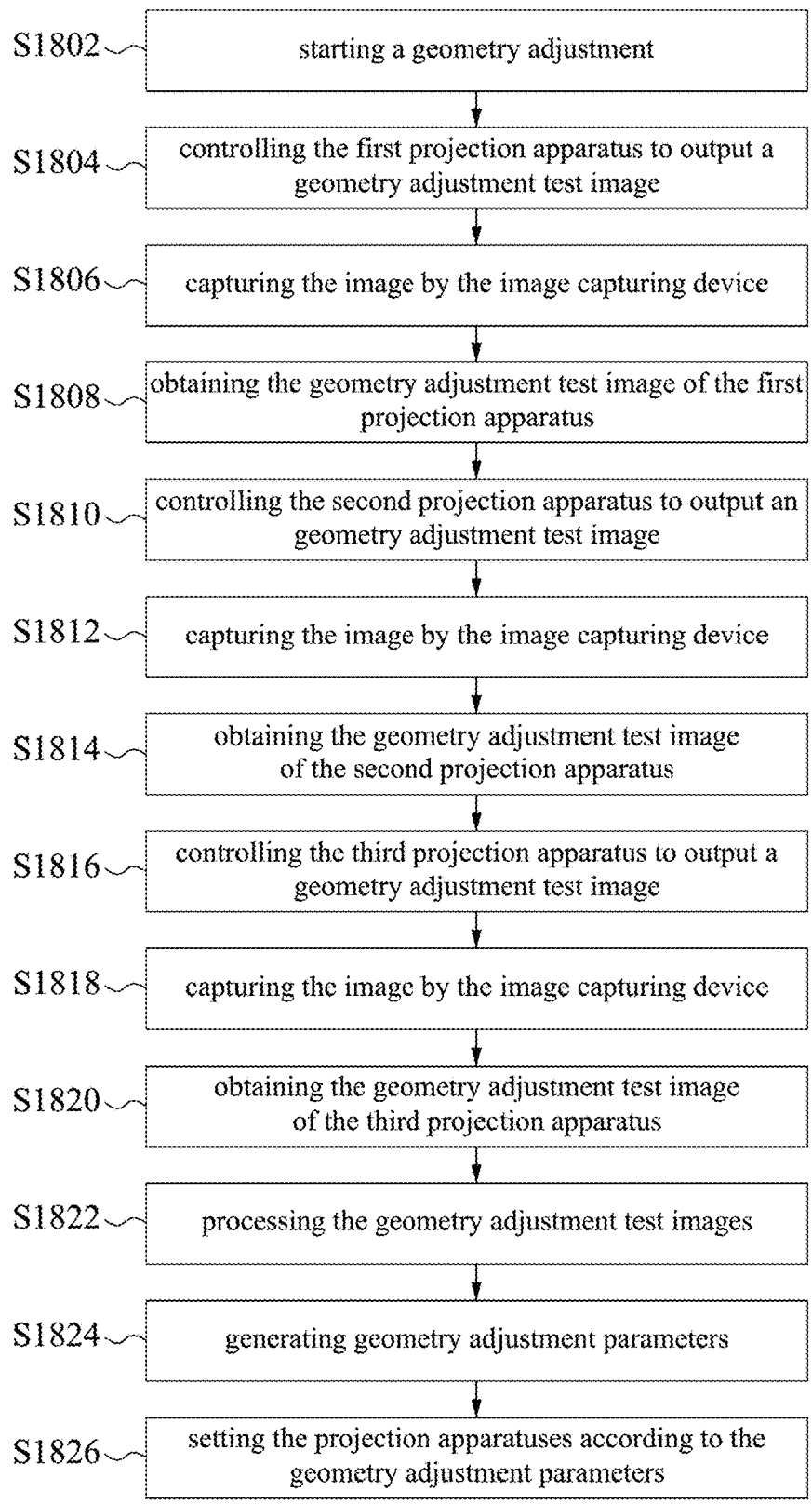
FIG. 18 illustrates a flowchart of a method of setting geometry adjustment parameters by a projection system according to some embodiments of the present disclosure.

Reference is made to FIG. 18. FIG. 18 illustrates a flowchart of a method 1800 of setting geometry adjustment parameters by the projection system 1600 according to some embodiments of the present disclosure. Geometry adjustment is, for example, to align a plurality of projection images that are not aligned at their boundaries. The method 1800 includes an operation S1802, an operation S1804, an operation S1806, an operation S1808, an operation S1810, an operation S1812, an operation S1814, an operation S1816, an operation S1818, an operation S1820, an operation S1822, an operation S1824, and an operation S1826. The method 1800 is discussed with reference to FIG. 16 to facilitate understanding. In operation S1802, a geometry adjustment is started. In operation S1804, the projection apparatus 1602 is controlled to output a geometry adjustment test image. The geometry adjustment test image is, for example, a square-grid type test image. In operation S1806, the image capturing device 1608 captures the geometry adjustment test image of the projection apparatus 1602. In operation S1808, the geometry adjustment test image of the projection apparatus 1602 is obtained. In operation S1810, the projection apparatus 1604 is controlled to output a geometry adjustment test image. In operation S1812, the image capturing device 1608 captures the geometry adjustment test image of the projection apparatus 1604. In operation S1814, the geometry adjustment test image of the projection apparatus 1604 is obtained. In operation S1816, the projection apparatus 1606 is controlled to output a geometry adjustment test image. In operation S1818, the image capturing device 1608 captures the geometry adjustment test image of the projection apparatus 1606. In operation S1820, the geometry adjustment test image of the projection apparatus 1606 is obtained. In operation S1822, the geometry adjustment test images of the projection apparatus 1602, the projection apparatus 1604, and the projection apparatus 1606 are processed. In operation S1824, geometry adjustment parameters of the projection apparatus 1602, the projection apparatus 1604, and the projection apparatus 1606 are generated. In operation S1826, the projection apparatus 1602, the projection apparatus 1604, and the projection apparatus 1606 are set according to the geometry adjustment parameters. Thus, the geometry adjustment process of projection images of a plurality of projection apparatuses can be completed.

In some embodiments, after the projection apparatus 1602, the projection apparatus 1604, and the projection apparatus 1606 complete the edge blending process and the geometry adjustment process, the projection images projected by the projection apparatus 1602, the projection apparatus 1604, and the projection apparatus 1606 can be better blended and a large projection image can be generated.

The above description of the method 1000, 1100, 1700, or 1800 includes exemplary operations, but the operations of the method 1000, 1100, 1700, or 1800 are not necessarily performed in the order shown. It is within the spirit and scope of the embodiments of the present disclosure that the order of the operations of the method 1000, 1100, 1700, or 1800 may be changed, or the operations may be performed simultaneously, partially simultaneously, or partially omitted, where appropriate.

In some embodiments, the method 1000, 1100, 1700 or 1800 may also be implemented as a computer program. When the computer program is executed by the processor 110 in FIG. 2A, a computer, or an electronic device, the executing device executes the method 1000, 1100, 1700 or 1800. The computer program may be stored in a non-transitory computer readable recording medium, such as a read only memory, a flash memory, a floppy disk, a hard disk, a compact disc, a flash disk, a USB disk, a tape, a database readable from a network, or any recording medium having the same function as would be apparent to one of ordinary skill in the art to which the present disclosure pertains.

As the above embodiments, the projection apparatus of the present disclosure has the Internet-connection function and can run an operation system, which can be used to realize a smart projector.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A projection apparatus comprising:
a control circuit comprising a first processor and having an Internet-connection function, the first processor being configured to run an operation system; and
a projection circuit, wherein the first processor is configured to control the projection circuit via a first control interface, wherein the projection circuit is configured to receive an original video signal generated from the control circuit to project a projection image based on the original video signal, wherein the projection circuit comprises:
a video signal scaler coupled to the first control interface, the video signal scaler being configured to perform a scaling function on the original video signal to generate a scaled video signal;

a warp circuit coupled to the first control interface and the video signal scaler, the warp circuit being configured to perform a warping function on the scaled video signal to generate a warped video signal;

a display driver coupled to the first control interface and the warp circuit, the display driver being configured to drive a digital micro-mirror device based on the warped video signal so that the digital micro-mirror device cooperates with a light source to project the projection image; and a video signal receiver coupled to the first control interface and the video signal scaler, the video signal receiver being configured to receive the original video signal so as to transmit the original video signal to the video signal scaler, wherein the video signal receiver is further configured to receive an external original video signal from an outside so as to transmit the external original video signal to the video signal scaler for processing and projection.

2. The projection apparatus of claim 1, wherein the projection circuit comprises:

a second processor coupled to the first control interface, wherein the first processor of the control circuit is configured to control the projection circuit via the first control interface and the second processor.

3. The projection apparatus of claim 1, wherein the control circuit further comprises:

a memory configured to store the operation system.

4. The projection apparatus of claim 1, wherein the control circuit further comprises:

a wired network port coupled to the first processor via a physical layer Integrated circuit to realize the Internet-connection function.

5. The projection apparatus of claim 1, wherein the control circuit further comprises:

a wireless network circuit coupled to the first processor via the first control interface to realize the Internet-connection function.

6. The projection apparatus of claim 1, wherein the control circuit further comprises:

a universal serial bus port coupled to the first processor.

7. The projection apparatus of claim 1, wherein the control circuit further comprises:

a touch panel coupled to the first control interface, the touch panel being configured to generate an operating instruction according to an operation of a user, the operating instruction being transmitted to the first processor via the first control interface, and the first processor being configured to control the control circuit or the projection circuit according to the operating instruction.

8. The projection apparatus of claim 1, wherein the control circuit further comprises:

an infrared receiver configured to receive a remote signal and provide the remote signal to the first processor, wherein the first processor is configured to control the control circuit or the projection circuit according to the remote signal.

9. The projection apparatus of claim 1, wherein the first processor comprises:

a video output port coupled to a High Definition Multimedia Interface framer, wherein the High Definition Multimedia Interface framer is configured to generate the original video signal.

10. The projection apparatus of claim 9, wherein the first processor further comprises:

an audio output port configured to output an audio signal to the High Definition Multimedia Interface framer.

11. The projection apparatus of claim 1, wherein the first processor comprises:

a V-by-one output port configured to output the original video signal to the projection circuit according to a V-by-one standard.

12. The projection apparatus of claim 1, wherein the control circuit further comprises:

a second control interface coupled to the first control interface, wherein the first processor of the control circuit is configured to control the projection circuit via the first control interface and the second control interface.

13. The projection apparatus of claim 1, wherein the projection circuit comprises:

a second processor coupled to the first control interface; and a second control interface coupled to the second processor, wherein the first processor of the control circuit is configured to control the projection circuit via the first control interface, the second processor, and the second control interface.

14. The projection apparatus of claim 1, wherein the control circuit is configured to connect to an audio/video server based on the Internet-connection function to receive audio/video data, and the projection circuit is configured to project the projection image based on the audio/video data.

15. The projection apparatus of claim 1, wherein the control circuit further comprises:

a memory configured to store audio/video data, wherein the projection circuit is configured to project the projection image based on the audio/video data stored in the memory.

16. The projection apparatus of claim 1, wherein the control circuit is configured to receive digital signage control information based on the Internet-connection function so as to control the projection circuit to project the projection image according to the digital signage control information, wherein the projection image corresponds to a plurality of projection panes, and any one of the projection panes is independent of any other of the projection panes.

17. The projection apparatus of claim 13, wherein the digital signage control information comprises pane configuration information and playlist information, and the control circuit controls the projection panes according to the pane configuration information and the playlist information.

18. The projection apparatus of claim 17, wherein the playlist information comprises pane information, time information, name information, and source information.

19. The projection apparatus of claim 1, wherein the control circuit is configured to connect to a video conferencing server based on the Internet-connection function, and the projection circuit projects a video conferencing picture according to a video conferencing service of the video conferencing server.

20. The projection apparatus of claim 1, wherein the control circuit is configured to connect to an electronic device based on the Internet-connection function so as to receive video conferencing data from the electronic device, and the projection circuit projects a video conferencing picture based on the video conferencing data.

21. The projection apparatus of claim 1, wherein the control circuit further comprises:

a memory configured to store user manual data, and the projection circuit projects explanatory text or an animation corresponding to an option based on the user manual data and the option of a user menu.

22. The projection apparatus of claim 21, wherein the animation is stored in the memory.

23. The projection apparatus of claim 21, wherein the user manual data is updated based on the Internet-connection function.

24. The projection apparatus of claim 1, further comprising:
a sensor configured to detect the projection apparatus to generate detected data, wherein the control circuit is configured to transmit the detected data to a server via a network based on the Internet-connection function.

25. The projection apparatus of claim 1, wherein the projection image is projected on a screen, wherein the first processor adjusts the projection image based on detected data corresponding to the screen.

26. The projection apparatus of claim 25, wherein the detected data comprises brightness data of the screen.

27. The projection apparatus of claim 1, wherein the control circuit is configured to receive an operating instruction from an electronic device and control the control circuit or the projection circuit according to the operating instruction, wherein the operating instruction is generated corresponding to an operation on a graphical user interface of the electronic device by a user, wherein the graphical user interface is comprised in an application or a web page.

28. A projection system comprising:
a first projection apparatus configured to project a first test image, the first projection apparatus being the projection apparatus of claim 1;
a second projection apparatus configured to project a second test image; and
an image capturing device coupled to the first projection apparatus and the second projection apparatus, the image capturing device being configured to receive the first test image and the second test image,
wherein the first projection apparatus is configured to adjust the first projection apparatus and the second projection apparatus based on the first test image and the second test image.

29. The projection system of claim 28, wherein the first projection apparatus is configured to generate a plurality of edge blending parameters based on the first test image and the second test image, and the first projection apparatus is configured to set the first projection apparatus and the second projection apparatus according to the edge blending parameters.

30. The projection system of claim 28, wherein the first projection apparatus is configured to generate a plurality of geometry adjustment parameters based on the first test image and the second test image, and the first projection apparatus is configured to set the first projection apparatus and the second projection apparatus according to the geometry adjustment parameters.

31. An operation method comprising:
running an operation system by a processor of a control circuit of a projection apparatus, wherein the control circuit has an Internet-connection function;
controlling a projection circuit of the projection apparatus via a control interface by the processor; and
receiving an original video signal generated from the control circuit so as to project a projection image based on the original video signal by the projection circuit;
wherein the operation of receiving an original video signal from the control circuit so as to project a projection image based on the original video signal by the projection circuit comprises:
receiving and transmitting the original video signal by a video signal receiver;
performing a scaling function on the original video signal to generate a scaled video signal by a video signal scaler;
performing a warping function on the scaled video signal to generate a warped video signal by a warp circuit;
driving a digital micro-mirror device based on the warped video signal so that the digital micro-mirror device cooperates with a light source to project the projection image by a display driver; and
receiving and transmitting an external original video signal from an outside to the video signal scaler for processing and projection by the video signal receiver.

32. The operation method of claim 31, further comprising:
starting the operation system by the control circuit;
setting the projection circuit by the control circuit;
enabling a light source of the projection circuit by the control circuit;
determining whether an operating instruction is received or not by the control circuit, wherein the operating instruction corresponds to an operation of a user;
interpreting the operating instruction by the control circuit;
determining whether the operating instruction is a valid operating instruction or not by the control circuit; and
executing a service correspondingly according to the valid operating instruction by the control circuit if the control circuit determines that the operating instruction is the valid operating instruction.

33. The operation method of claim 31, further comprising:
setting a plurality of projection panes corresponding to the projection image according to pane configuration information by the control circuit;
receiving playlist information by the control circuit;
receiving a plurality of projection contents according to the playlist information by the control circuit;
updating the projection panes according to the projection contents by the control circuit;
combining the projection contents by the control circuit so as to generate combined projection image data; and
projecting the projection image based on the combined projection image data by the projection circuit.

34. The operation method of claim 33, further comprising:
updating the playlist information according to a current time by the control circuit.

* * * * *